United States Patent
Burbank et al.

(10) Patent No.: US 12,108,926 B2
(45) Date of Patent: *Oct. 8, 2024

(54) VISUAL FIDUCIAL FOR BEHAVIOR CONTROL ZONE

(71) Applicant: iRobot Corporation, Bedford, MA (US)

(72) Inventors: Eric J. Burbank, Lynnfield, MA (US); Oliver Lewis, Waltham, MA (US)

(73) Assignee: iRobot Corporation, Bedford, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/236,073

(22) Filed: Aug. 21, 2023

(65) Prior Publication Data

US 2023/0389762 A1 Dec. 7, 2023

Related U.S. Application Data

(63) Continuation of application No. 16/993,643, filed on Aug. 14, 2020, now Pat. No. 11,730,328.

(51) Int. Cl.
*G01C 21/00* (2006.01)
*A47L 9/00* (2006.01)
(Continued)

(52) U.S. Cl.
CPC ............. *A47L 9/2852* (2013.01); *A47L 9/009* (2013.01); *A47L 9/2805* (2013.01);
(Continued)

(58) Field of Classification Search
CPC ...... A47L 9/2852; A47L 9/009; A47L 9/2805; A47L 2201/04; G01C 21/383;
(Continued)

(56) References Cited

U.S. PATENT DOCUMENTS 7,416,119 B1   8/2008  Inderrieden
9,538,702 B2   1/2017  Balutis et al.
(Continued)

FOREIGN PATENT DOCUMENTS

CN    209377464 U    9/2019
JP    6259233 B2    12/2017
(Continued)

OTHER PUBLICATIONS

U.S. Appl. No. 16/993,643 U.S. Pat. No. 11,730,328, filed Aug. 14, 2020, Visual Fiducial for Behavior Control Zone.
(Continued)

*Primary Examiner* — Harry Y Oh
(74) *Attorney, Agent, or Firm* — Schwegman Lundberg & Woessner, P.A.

(57) ABSTRACT

A mobile cleaning robot system can include a mobile cleaning robot and processing circuitry. The mobile cleaning robot can include a camera and can be operable to clean a floor surface of an environment. The processing circuitry can be in communication with the mobile cleaning robot and the camera, the processing circuitry configured to produce an image output based on an optical field of view of the camera. The processing circuitry can also detect a visual fiducial in the image output and can determine a behavior modification based on the visual fiducial. The processing circuitry can modify movement of the mobile cleaning robot based on the behavior modification.

20 Claims, 15 Drawing Sheets

(51) Int. Cl.
*A47L 9/28* (2006.01)
*G05D 1/00* (2024.01)

(52) U.S. Cl.
CPC ....... *G01C 21/383* (2020.08); *G01C 21/3837* (2020.08); *G05D 1/0214* (2013.01); *G05D 1/0221* (2013.01); *G05D 1/0234* (2013.01); *A47L 2201/04* (2013.01); *G05D 1/0088* (2013.01)

(58) Field of Classification Search
CPC ............ G01C 21/3837; G05D 1/0214; G05D 1/0221; G05D 1/0234; G05D 1/0088; G05D 1/2446
See application file for complete search history.

(56) References Cited

U.S. PATENT DOCUMENTS

| | | | |
|---|---|---|---|
| 9,665,095 | B1 | 5/2017 | Romano et al. |
| 9,682,483 | B1 | 6/2017 | Romano et al. |
| 10,318,907 | B1 | 6/2019 | Bergstrom et al. |
| 11,730,328 | B2 | 8/2023 | Burbank et al. |
| 2007/0244610 | A1 | 10/2007 | Ozick et al. |
| 2011/0202857 | A1 | 8/2011 | Coenen et al. |
| 2014/0371909 | A1* | 12/2014 | Lee ........................ G06F 3/00 700/259 |
| 2015/0271991 | A1 | 10/2015 | Balutis |
| 2016/0297072 | A1* | 10/2016 | Williams ............ B25J 9/1694 |
| 2017/0098149 | A1* | 4/2017 | Kesler ................... H02J 50/12 |
| 2018/0065253 | A1 | 3/2018 | Williams et al. |
| 2018/0089616 | A1* | 3/2018 | Jacobus ............ G05D 1/0274 |
| 2018/0118337 | A1 | 5/2018 | Viel |
| 2018/0344116 | A1* | 12/2018 | Schriesheim ........ G05D 1/0044 |
| 2019/0015985 | A1 | 1/2019 | Kim et al. |
| 2019/0061157 | A1 | 2/2019 | Suvarna et al. |
| 2019/0061623 | A1 | 2/2019 | Borkowski |
| 2019/0180453 | A1 | 6/2019 | Silva et al. |
| 2019/0365176 | A1 | 12/2019 | Kim et al. |
| 2020/0019180 | A1 | 1/2020 | Chae |
| 2020/0042832 | A1* | 2/2020 | Kim ..................... G06F 18/217 |
| 2020/0046193 | A1 | 2/2020 | Chae |
| 2020/0069140 | A1 | 3/2020 | Orzechowski et al. |
| 2020/0205629 | A1* | 7/2020 | Hong ..................... A47L 9/009 |
| 2020/0241551 | A1* | 7/2020 | Cairl ................. G06K 19/06037 |
| 2020/0286381 | A1 | 9/2020 | Higashi |
| 2021/0132607 | A1 | 5/2021 | Maeng et al. |
| 2021/0192769 | A1 | 6/2021 | Lee |
| 2021/0201464 | A1 | 7/2021 | Tariq et al. |
| 2021/0204785 | A1 | 7/2021 | Lee et al. |
| 2021/0331112 | A1 | 10/2021 | Kim et al. |
| 2021/0333790 | A1 | 10/2021 | Kean et al. |
| 2021/0338028 | A1 | 11/2021 | Park et al. |
| 2022/0047134 | A1 | 2/2022 | Burbank et al. |
| 2022/0209136 | A1 | 6/2022 | Kawakami et al. |

FOREIGN PATENT DOCUMENTS

| | | |
|---|---|---|
| JP | 2019091224 A | 6/2019 |
| KR | 20180037516 A | 4/2018 |
| WO | WO-2022035633 A1 | 2/2022 |

OTHER PUBLICATIONS

"European Application Serial No. 21762550.8, Response filed Sep. 28, 2023 to Communication pursuant to Rules 161(1) and 162 EP", 8 pgs.
Machine translation of JP6259233B2.
Machine Translation of CN209377464U.
"U.S. Appl. No. 16/993,643, Examiner Interview Summary mailed Dec. 27, 2022", 2 pgs.
"U.S. Appl. No. 16/993,643, Final Office Action mailed Apr. 5, 2023", 22 pgs.
"U.S. Appl. No. 16/993,643, Non Final Office Action mailed Sep. 29, 2022", 19 pgs.
"U.S. Appl. No. 16/993,643, Notice of Allowance mailed Jun. 15, 2023", 13 pgs.
"U.S. Appl. No. 16/993,643, Response filed Jan. 4, 2023 to Non Final Office Action mailed Sep. 29, 2022", 12 pgs.
"U.S. Appl. No. 16/993,643, Response filed Jun. 5, 2023 to Final Office Action mailed Apr. 5, 2023", 7 pgs.
"International Application Serial No. PCT/US2021/044180, International Preliminary Report on Patentability mailed Feb. 23, 2023", 14 pgs.
"International Application Serial No. PCT/US2021/044180, International Search Report mailed Jan. 27, 2022", 7 pgs.
"International Application Serial No. PCT/US2021/044180, Invitation to Pay Additional Fees mailed Oct. 26, 2021", 13 pgs.
"International Application Serial No. PCT/US2021/044180, Written Opinion mailed Jan. 27, 2022", 12 pgs.
"European Application Serial No. 21762550.8, Notification Regarding Rule 164 and Article 94(3) EPC mailed Jun. 13, 2024", 14 pgs.

* cited by examiner

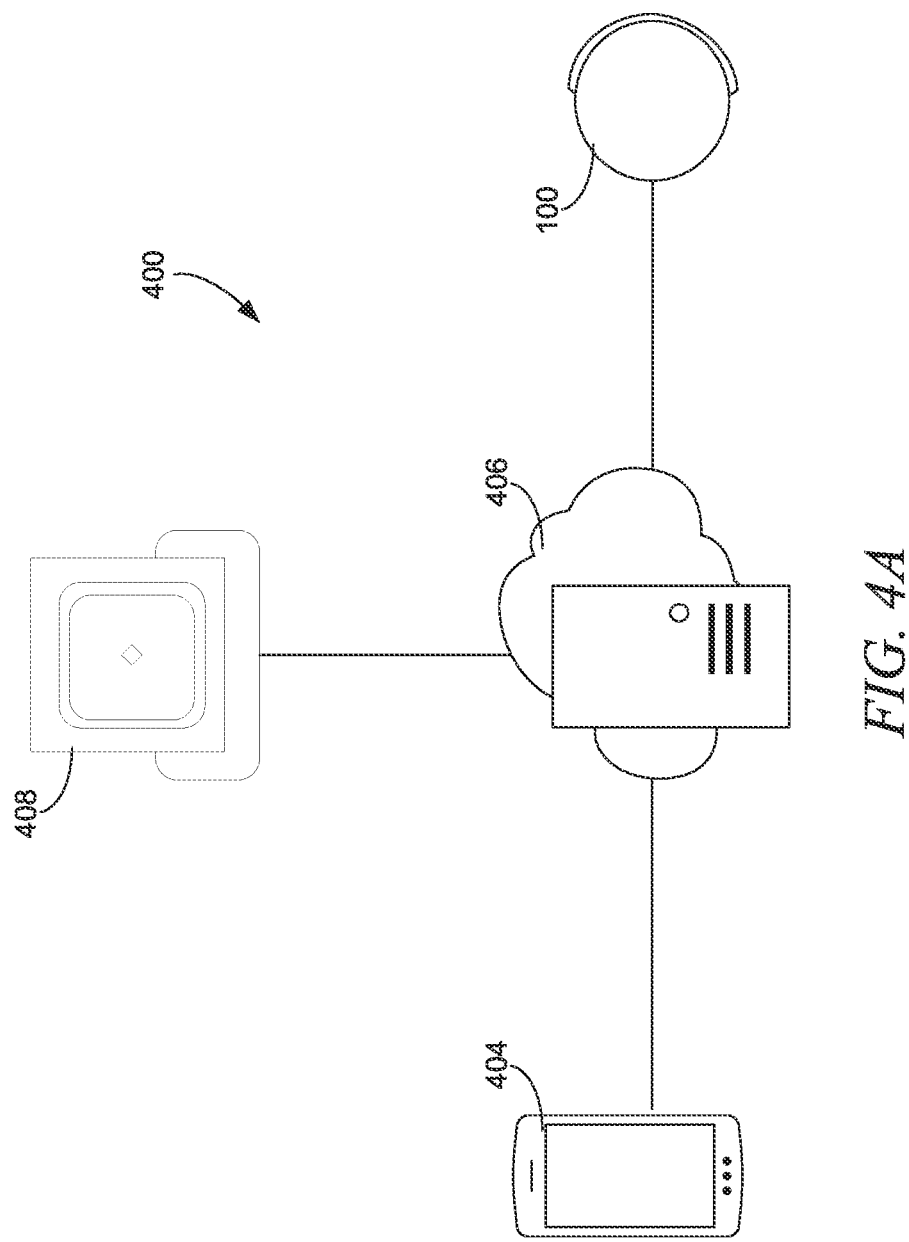

VISUAL FIDUCIAL FOR BEHAVIOR CONTROL ZONE

PRIORITY APPLICATIONS

This application is a continuation of U.S. patent application Ser. No. 16/993,643, filed Aug. 14, 2020, the content of which is incorporated herein by reference in its entirety.

BACKGROUND

Autonomous mobile robots can move about an environment and can perform functions and operations in a variety of categories, including but not limited to security operations, infrastructure or maintenance operations, navigation or mapping operations, inventory management operations, and robot/human interaction operations. Some mobile robots, known as cleaning robots, can perform cleaning tasks autonomously within an environment, e.g., a home. Many kinds of cleaning robots are autonomous to some degree and in different ways. For example, a cleaning robot can conduct cleaning missions, where the robot traverses and simultaneously ingests (e.g., vacuums) debris from the floor surface of their environment.

SUMMARY

As autonomous mobile cleaning robots move throughout an environment to perform cleaning routines or missions, the robots can encounter areas or zones that a user would prefer are not encountered by the robot, such as a portion of a room or an area with electrical cords. To address this issue, keep out zones can be added to a map of the environment to instruct the robot to avoid a particular area. However, a robot must often traverse an area before a map can be created. Active barriers can be used to instruct the robot during periods where the map has not yet been created or to help create a temporary virtual barrier or keep out zone. However, in some cases, many barriers are required to set up a map and the cost of providing multiple active barriers can be relatively high.

The devices, systems, or methods of this application can help to address this issue by using a mobile cleaning device and methods using a passive visual fiducial or indicator on a barrier that can be temporary or disposable. The barrier can include a passive indicator such as a matrix code (e.g., quick response code or April Tag) and the robot can include a camera for detecting the passive indicator. The robot can also include processing circuitry to analyze the video stream produced by the camera to identify the passive indicator and to determine a behavior associated with the indicator such as a keep out zone. The processing circuitry can then instruct the robot to modify its behavior with regard to an area around the barrier and the processing circuitry can update the map of the environment or create the map using the modified behavior. Such a system can use several towers or passive visual indicators that can be relatively low cost and can be disposable or recyclable following map creation.

The above discussion is intended to provide an overview of subject matter of the present patent application. It is not intended to provide an exclusive or exhaustive explanation of the invention. The description below is included to provide further information about the present patent application.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

FIG. 4A illustrates a diagram illustrating an example of a communication network in which a mobile cleaning robot operates and data transmission in the network.

DETAILED DESCRIPTION

Figure 1:
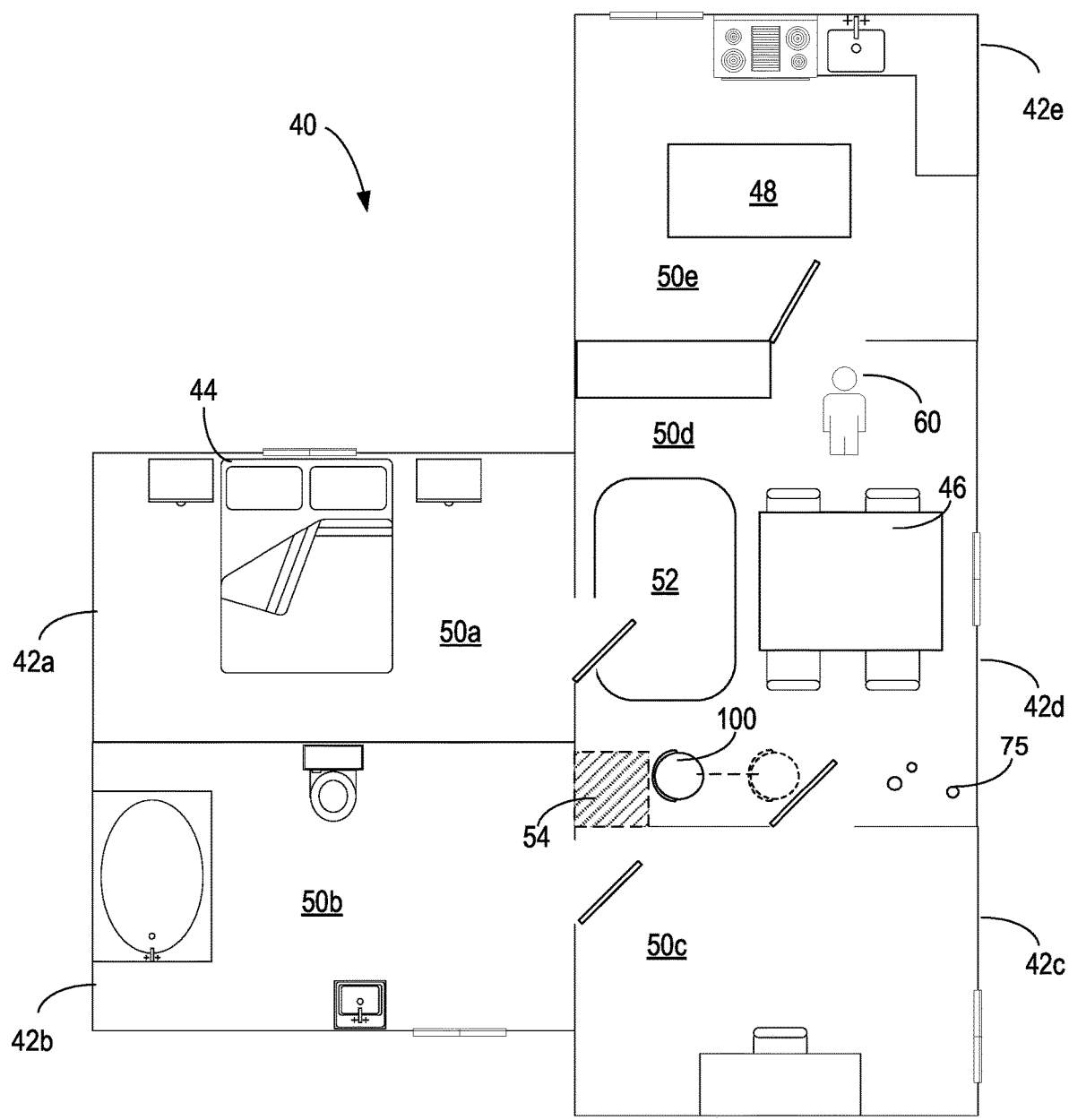
FIG. 1 illustrates a plan view of a mobile cleaning robot in an environment.

FIG. 1 illustrates a plan view of a mobile cleaning robot 100 in an environment 40, in accordance with at least one example of this disclosure. The environment 40 can be a dwelling, such as a home or an apartment, and can include rooms 42a-42e. Obstacles, such as a bed 44, a table 46, and an island 48 can be located in the rooms 42 of the environment. Each of the rooms 42a-42e can have a floor surface 50a-50e, respectively. Some rooms, such as the room 42d, can include a rug, such as a rug 52. The floor surfaces 50 can be of one or more types such as hardwood, ceramic, low-pile carpet, medium-pile carpet, long (or high)-pile carpet, stone, or the like.

The mobile cleaning robot 100 can be operated, such as by a user 60, to autonomously clean the environment 40 in a room-by-room fashion. In some examples, the robot 100 can clean the floor surface 50a of one room, such as the room 42a, before moving to the next room, such as the room 42d, to clean the surface of the room 42d. Different rooms can have different types of floor surfaces. For example, the room 42e (which can be a kitchen) can have a hard floor surface, such as wood or ceramic tile, and the room 42a (which can be a bedroom) can have a carpet surface, such as a medium pile carpet. Other rooms, such as the room 42*d* (which can be a dining room) can include multiple surfaces where the rug 52 is located within the room 42*d*.

During cleaning or traveling operations, the robot 100 can use data collected from various sensors (such as optical sensors) and calculations (such as odometry and obstacle detection) to develop a map of the environment 40. Once the map is created, the user 60 can define rooms or zones (such as the rooms 42) within the map. The map can be presentable to the user 60 on a user interface, such as a mobile device, where the user 60 can direct or change cleaning preferences, for example.

Also, during operation, the robot 100 can detect surface types within each of the rooms 42, which can be stored in the robot or another device. The robot 100 can update the map (or data related thereto) such as to include or account for surface types of the floor surfaces 50*a*-50*e* of each of the respective rooms 42 of the environment. In some examples, the map can be updated to show the different surface types such as within each of the rooms 42.

In some examples, the user 60 can define a behavior control zone 54 using, for example, the methods and systems described herein. In response to the user 60 defining the behavior control zone 54, the robot 100 can move toward the behavior control zone 54 to confirm the selection. After confirmation, autonomous operation of the robot 100 can be initiated. In autonomous operation, the robot 100 can initiate a behavior in response to being in or near the behavior control zone 54. For example, the user 60 can define an area of the environment 40 that is prone to becoming dirty to be the behavior control zone 54. In response, the robot 100 can initiate a focused cleaning behavior in which the robot 100 performs a focused cleaning of a portion of the floor surface 50*d* in the behavior control zone 54.

Components of the Robot

Figure 2A:
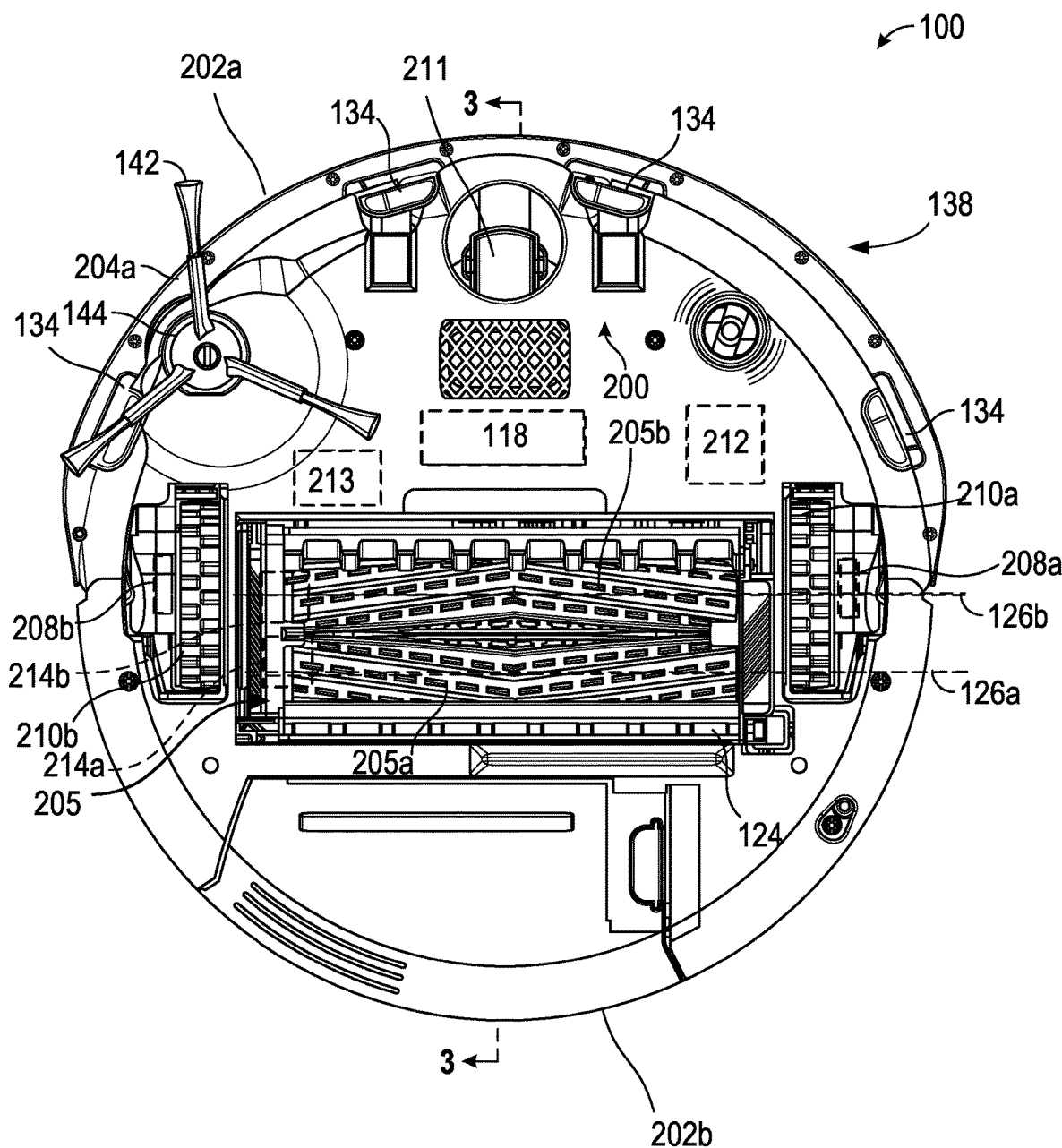
FIG. 2A illustrates a bottom view of a mobile cleaning robot.
Figure 2B:
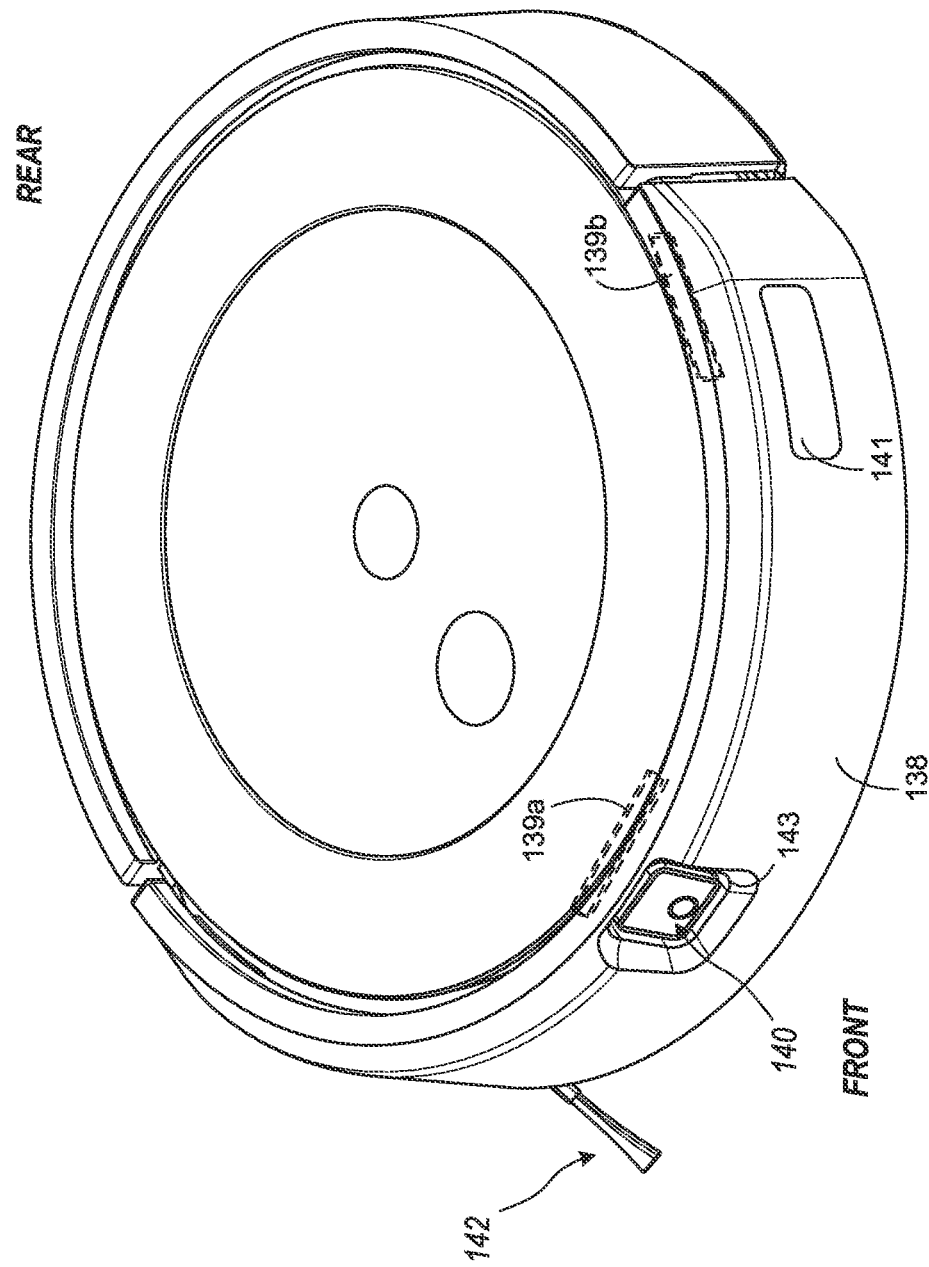
FIG. 2B illustrates an isometric view of a mobile cleaning robot.
Figure 3:
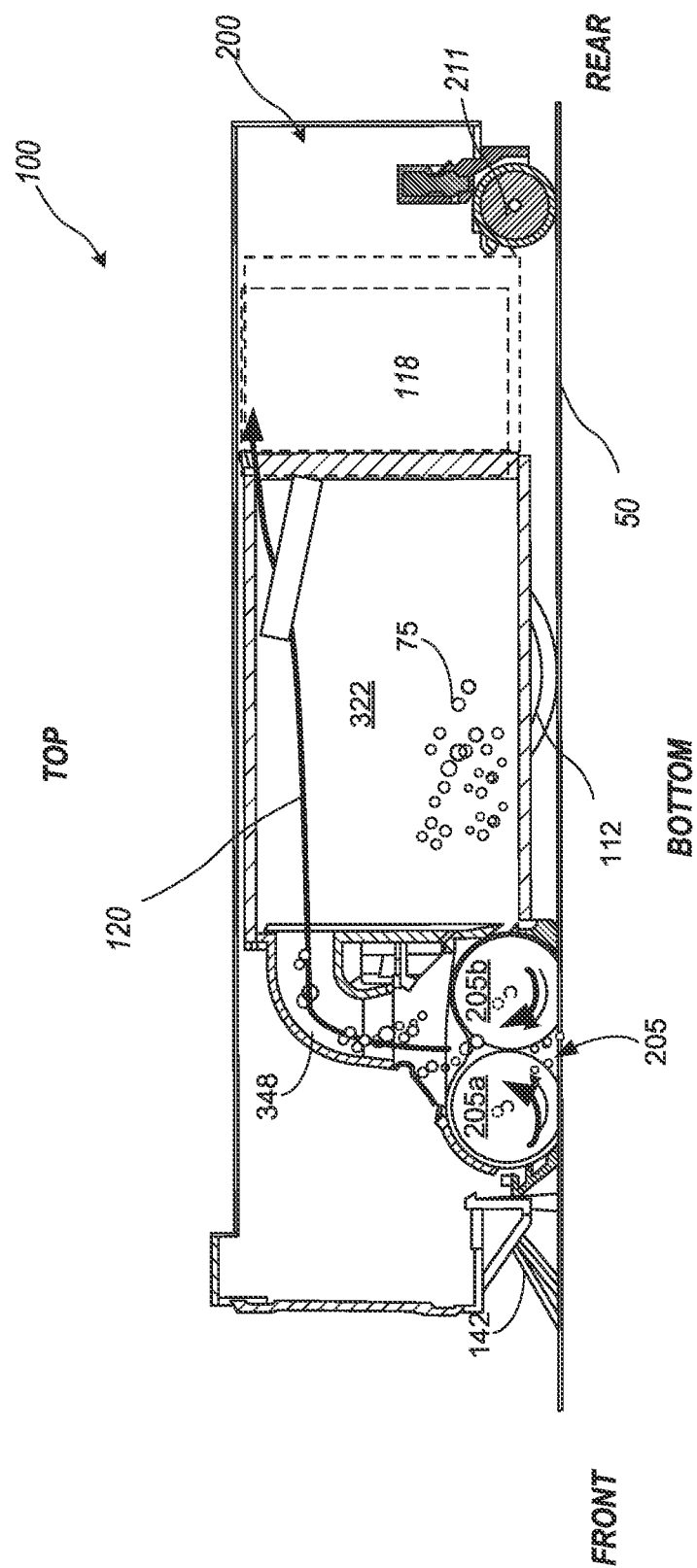
FIG. 3 illustrates a cross-section view across indicators 3-3 of FIG. 2A of a mobile cleaning robot.

FIG. 2A illustrates a bottom view of the mobile cleaning robot 100. FIG. 2B illustrates a bottom view of the mobile cleaning robot 100. FIG. 3 illustrates a cross-section view across indicators 3-3 of FIG. 2A of the mobile cleaning robot 100. FIG. 3 also shows orientation indicators Bottom, Top, Front, and Rear. FIGS. 2A-3 are discussed together below.

The cleaning robot 100 can be an autonomous cleaning robot that autonomously traverses the floor surface 50 while ingesting the debris 75 from different parts of the floor surface 50. As depicted in FIGS. 2A and 3, the robot 100 includes a body 200 movable across the floor surface 50. The body 200 can include multiple connected structures to which movable components of the cleaning robot 100 are mounted. The connected structures can include, for example, an outer housing to cover internal components of the cleaning robot 100, a chassis to which drive wheels 210*a* and 210*b* and the cleaning rollers 205*a* and 205*b* (of a cleaning assembly 205) are mounted, a bumper 138 mounted to the outer housing, etc.

As shown in FIG. 2A, the body 200 includes a front portion 202*a* that has a substantially semicircular shape and a rear portion 202*b* that has a substantially semicircular shape. As shown in FIG. 2A, the robot 100 can include a drive system including actuators 208*a* and 208*b*, e.g., motors, operable with drive wheels 210*a* and 210*b*. The actuators 208*a* and 208*b* can be mounted in the body 200 and can be operably connected to the drive wheels 210*a* and 210*b*, which are rotatably mounted to the body 200. The drive wheels 210*a* and 210*b* support the body 200 above the floor surface 50. The actuators 208*a* and 208*b*, when driven, can rotate the drive wheels 210*a* and 210*b* to enable the robot 100 to autonomously move across the floor surface 50.

The controller 212 can be located within the housing and can be a programable controller, such as a single or multi-board computer, a direct digital controller (DDC), a programable logic controller (PLC), or the like. In other examples the controller 212 can be any computing device, such as a handheld computer, for example, a smart phone, a tablet, a laptop, a desktop computer, or any other computing device including a processor, memory, and communication capabilities. The memory 213 can be one or more types of memory, such as volatile or non-volatile memory, read-only memory (ROM), random-access memory (RAM), magnetic disk storage media, optical storage media, flash-memory devices, and other storage devices and media. The memory 213 can be located within the housing 200, connected to the controller 212 and accessible by the controller 212.

The controller 212 can operate the actuators 208*a* and 208*b* to autonomously navigate the robot 100 about the floor surface 50 during a cleaning operation. The actuators 208*a* and 208*b* are operable to drive the robot 100 in a forward drive direction, in a backwards direction, and to turn the robot 100. The robot 100 can include a caster wheel 211 that supports the body 200 above the floor surface 50. The caster wheel 211 can support the rear portion 202*b* of the body 200 above the floor surface 50, and the drive wheels 210*a* and 210*b* support the front portion 202*a* of the body 200 above the floor surface 50.

As shown in FIG. 3, a vacuum assembly 118 can be carried within the body 200 of the robot 100, e.g., in the front portion 202*a* of the body 200. The controller 212 can operate the vacuum assembly 118 to generate an airflow that flows through the air gap near the cleaning rollers 205, through the body 200, and out of the body 200. The vacuum assembly 118 can include, for example, an impeller that generates the airflow when rotated. The airflow and the cleaning rollers 205, when rotated, cooperate to ingest debris 75 into the robot 100. A cleaning bin 322 mounted in the body 200 contains the debris 75 ingested by the robot 100, and a filter in the body 200 separates the debris 75 from the airflow before the airflow 120 enters the vacuum assembly 118 and is exhausted out of the body 200. In this regard, the debris 75 is captured in both the cleaning bin 322 and the filter before the airflow 120 is exhausted from the body 200.

The cleaning rollers 205*a* and 205*b* can operably connected to actuators 214*a* and 214*b*, e.g., motors, respectively. The cleaning head 205 and the cleaning rollers 205*a* and 205*b* can positioned forward of the cleaning bin 322. The cleaning rollers 205*a* and 205*b* can be mounted to a housing 124 of the cleaning head 205 and mounted, e.g., indirectly or directly, to the body 200 of the robot 100. In particular, the cleaning rollers 205*a* and 205*b* are mounted to an underside of the body 200 so that the cleaning rollers 205*a* and 205*b* engage debris 75 on the floor surface 50 during the cleaning operation when the underside faces the floor surface 50.

The housing 124 of the cleaning head 205 can be mounted to the body 200 of the robot 100. In this regard, the cleaning rollers 205*a* and 205*b* are also mounted to the body 200 of the robot 100, e.g., indirectly mounted to the body 200 through the housing 124. Alternatively, or additionally, the cleaning head 205 is a removable assembly of the robot 100 in which the housing 124 with the cleaning rollers 205*a* and 205*b* mounted therein is removably mounted to the body 200 of the robot 100. The housing 124 and the cleaning rollers 205*a* and 205*b* are removable from the body 200 as a unit so that the cleaning head 205 is easily interchangeable with a replacement cleaning head 205.

The control system can further include a sensor system with one or more electrical sensors. The sensor system, as described herein, can generate a signal indicative of a current location of the robot 100, and can generate signals indicative of locations of the robot 100 as the robot 100 travels along the floor surface 50.

Cliff sensors 134 (shown in FIG. 2A) can be located along a bottom portion of the housing 200. Each of the cliff sensors 134 can be an optical sensor that can be configured to detect a presence or absence of an object below the optical sensor, such as the floor surface 50. The cliff sensors 134 can be connected to the controller 212. A bumper 138 can be removably secured to the body 200 and can be movable relative to body 200 while mounted thereto. In some examples, the bumper 138 form part of the body 200. The bump sensors 139a and 139b (the bump sensors 139) can be connected to the body 200 and engageable or configured to interact with the bumper 138. The bump sensors 139 can include break beam sensors, capacitive sensors, switches, or other sensors that can detect contact between the robot 100, i.e., the bumper 138, and objects in the environment 40. The bump sensors 139 can be in communication with the controller 212.

An image capture device 140 can be a camera connected to the body 200 and can extend through the bumper 138 of the robot 100, such as through an opening 143 of the bumper 138. The image capture device 140 can be a camera, such as a front-facing camera, configured to generate a signal based on imagery of the environment 40 of the robot 100 as the robot 100 moves about the floor surface 50. The image capture device 140 can transmit the signal to the controller 212 for use for navigation and cleaning routines.

Obstacle following sensors 141 (shown in FIG. 2B) can include an optical sensor facing outward from the bumper 138 and that can be configured to detect the presence or the absence of an object adjacent to a side of the body 200. The obstacle following sensor 141 can emit an optical beam horizontally in a direction perpendicular (or nearly perpendicular) to the forward drive direction of the robot 100. The optical emitter can emit an optical beam outward from the robot 100, e.g., outward in a horizontal direction, and the optical detector detects a reflection of the optical beam that reflects off an object near the robot 100. The robot 100, e.g., using the controller 212, can determine a time of flight of the optical beam and thereby determine a distance between the optical detector and the object, and hence a distance between the robot 100 and the object.

A side brush 142 can be connected to an underside of the robot 100 and can be connected to a motor 144 operable to rotate the side brush 142 with respect to the body 200 of the robot 100. The side brush 142 can be configured to engage debris to move the debris toward the cleaning assembly 205 or away from edges of the environment 40. The motor 144 configured to drive the side brush 142 can be in communication with the controller 112. The brush 142 can rotate about a non-horizontal axis, e.g., an axis forming an angle between 75 degrees and 90 degrees with the floor surface 50. The non-horizontal axis, for example, can form an angle between degrees and 90 degrees with the longitudinal axes 126a and 126b of the rollers 205a and 205b.

The brush 142 can be a side brush laterally offset from a center of the robot 100 such that the brush 142 can extend beyond an outer perimeter of the body 200 of the robot 100. Similarly, the brush 142 can also be forwardly offset of a center of the robot 100 such that the brush 142 also extends beyond the bumper 138.

Operation of the Robot

In operation of some examples, the robot 100 can be propelled in a forward drive direction or a rearward drive direction. The robot 100 can also be propelled such that the robot 100 turns in place or turns while moving in the forward drive direction or the rearward drive direction.

When the controller 212 causes the robot 100 to perform a mission, the controller 212 can operate the motors 208 to drive the drive wheels 210 and propel the robot 100 along the floor surface 50. In addition, the controller 212 can operate the motors 214 to cause the rollers 205a and 205b to rotate, can operate the motor 144 to cause the brush 142 to rotate, and can operate the motor of the vacuum system 118 to generate airflow. The controller 212 can execute software stored on the memory 213 to cause the robot 100 to perform various navigational and cleaning behaviors by operating the various motors of the robot 100.

The various sensors of the robot 100 can be used to help the robot navigate and clean within the environment 40. For example, the cliff sensors 134 can detect obstacles such as drop-offs and cliffs below portions of the robot 100 where the cliff sensors 134 are disposed. The cliff sensors 134 can transmit signals to the controller 212 so that the controller 212 can redirect the robot 100 based on signals from the cliff sensors 134.

In some examples, a bump sensor 139a can be used to detect movement of the bumper 138 along a fore-aft axis of the robot 100. A bump sensor 139b can also be used to detect movement of the bumper 138 along one or more sides of the robot 100. The bump sensors 139 can transmit signals to the controller 212 so that the controller 212 can redirect the robot 100 based on signals from the bump sensors 139.

The image capture device 140 can be configured to generate a signal based on imagery of the environment 40 of the robot 100 as the robot 100 moves about the floor surface 50. The image capture device 140 can transmit such a signal to the controller 212. The image capture device 140 can be angled in an upward direction, e.g., angled between 5 degrees and 45 degrees from the floor surface 50 about which the robot 100 navigates. The image capture device 140, when angled upward, can capture images of wall surfaces of the environment so that features corresponding to objects on the wall surfaces can be used for localization.

In some examples, the obstacle following sensors 141 can detect detectable objects, including obstacles such as furniture, walls, persons, and other objects in the environment of the robot 100. In some implementations, the sensor system can include an obstacle following sensor along a side surface, and the obstacle following sensor can detect the presence or the absence an object adjacent to the side surface. The one or more obstacle following sensors 141 can also serve as obstacle detection sensors, similar to the proximity sensors described herein.

The robot 100 can also include sensors for tracking a distance travelled by the robot 100. For example, the sensor system can include encoders associated with the motors 208 for the drive wheels 210, and the encoders can track a distance that the robot 100 has travelled. In some implementations, the sensor can include an optical sensor facing downward toward a floor surface. The optical sensor can be positioned to direct light through a bottom surface of the robot 100 toward the floor surface 50. The optical sensor can detect reflections of the light and can detect a distance travelled by the robot 100 based on changes in floor features as the robot 100 travels along the floor surface 50.

The controller 212 can use data collected by the sensors of the sensor system to control navigational behaviors of the robot 100 during the mission. For example, the controller 212 can use the sensor data collected by obstacle detection sensors of the robot 100, (the cliff sensors 134, the bump sensors 139, and the image capture device 140) to enable the robot 100 to avoid obstacles within the environment of the robot 100 during the mission.

The sensor data can also be used by the controller 212 for simultaneous localization and mapping (SLAM) techniques in which the controller 212 extracts features of the environment represented by the sensor data and constructs a map of the floor surface 50 of the environment. The sensor data collected by the image capture device 140 can be used for techniques such as vision-based SLAM (VSLAM) in which the controller 212 extracts visual features corresponding to objects in the environment 40 and constructs the map using these visual features. As the controller 212 directs the robot 100 about the floor surface 50 during the mission, the controller 212 can use SLAM techniques to determine a location of the robot 100 within the map by detecting features represented in collected sensor data and comparing the features to previously stored features. The map formed from the sensor data can indicate locations of traversable and non-traversable space within the environment. For example, locations of obstacles can be indicated on the map as non-traversable space, and locations of open floor space can be indicated on the map as traversable space.

The sensor data collected by any of the sensors can be stored in the memory 213. In addition, other data generated for the SLAM techniques, including mapping data forming the map, can be stored in the memory 213. These data produced during the mission can include persistent data that are produced during the mission and that are usable during further missions. In addition to storing the software for causing the robot 100 to perform its behaviors, the memory 213 can store data resulting from processing of the sensor data for access by the controller 212. For example, the map can be a map that is usable and updateable by the controller 212 of the robot 100 from one mission to another mission to navigate the robot 100 about the floor surface 50.

The persistent data, including the persistent map, helps to enable the robot 100 to efficiently clean the floor surface 50. For example, the map enables the controller 212 to direct the robot 100 toward open floor space and to avoid non-traversable space. In addition, for subsequent missions, the controller 212 can use the map to optimize paths taken during the missions to help plan navigation of the robot 100 through the environment 40.

Network Examples

FIG. 4A is a diagram illustrating by way of example and not limitation a communication network 400 that enables networking between the mobile robot 100 and one or more other devices, such as a mobile device 404, a cloud computing system 406, or another autonomous robot 408 separate from the mobile robot 404. Using the communication network 410, the robot 100, the mobile device 404, the robot 408, and the cloud computing system 406 can communicate with one another to transmit and receive data from one another. In some examples, the robot 100, the robot 408, or both the robot 100 and the robot 408 communicate with the mobile device 404 through the cloud computing system 406. Alternatively, or additionally, the robot 100, the robot 408, or both the robot 100 and the robot 408 communicate directly with the mobile device 404. Various types and combinations of wireless networks (e.g., Bluetooth, radio frequency, optical based, etc.) and network architectures (e.g., mesh networks) can be employed by the communication network 410.

In some examples, the mobile device 404 can be a remote device that can be linked to the cloud computing system 406 and can enable a user to provide inputs. The mobile device 404 can include user input elements such as, for example, one or more of a touchscreen display, buttons, a microphone, a mouse, a keyboard, or other devices that respond to inputs provided by the user. The mobile device 404 can also include immersive media (e.g., virtual reality) with which the user can interact to provide input. The mobile device 404, in these examples, can be a virtual reality headset or a head-mounted display.

The user can provide inputs corresponding to commands for the mobile robot 404. In such cases, the mobile device 404 can transmit a signal to the cloud computing system 406 to cause the cloud computing system 406 to transmit a command signal to the mobile robot 100. In some implementations, the mobile device 404 can present augmented reality images. In some implementations, the mobile device 404 can be a smart phone, a laptop computer, a tablet computing device, or other mobile device.

According to some examples discussed herein, the mobile device 404 can include a user interface configured to display a map of the robot environment. A robot path, such as that identified by a coverage planner, can also be displayed on the map. The interface can receive a user instruction to modify the environment map, such as by adding, removing, or otherwise modifying a keep-out zone in the environment; adding, removing, or otherwise modifying a focused cleaning zone in the environment (such as an area that requires repeated cleaning); restricting a robot traversal direction or traversal pattern in a portion of the environment; or adding or changing a cleaning rank, among others.

In some examples, the communication network 410 can include additional nodes. For example, nodes of the communication network 410 can include additional robots. Also, nodes of the communication network 410 can include network-connected devices that can generate information about the environment 40. Such a network-connected device can include one or more sensors, such as an acoustic sensor, an image capture system, or other sensor generating signals, to detect characteristics of the environment 40 from which features can be extracted. Network-connected devices can also include home cameras, smart sensors, or the like.

In the communication network 410, the wireless links can utilize various communication schemes, protocols, etc., such as, for example, Bluetooth classes, Wi-Fi, Bluetooth-low-energy, also known as BLE, 802.15.4, Worldwide Interoperability for Microwave Access (WiMAX), an infrared channel, satellite band, or the like. In some examples, wireless links can include any cellular network standards used to communicate among mobile devices, including, but not limited to, standards that qualify as 1G, 2G, 3G, 4G, 5G, or the like. The network standards, if utilized, qualify as, for example, one or more generations of mobile telecommunication standards by fulfilling a specification or standards such as the specifications maintained by International Telecommunication Union. For example, the 4G standards can correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards can use various channel access methods, e.g., FDMA, TDMA, CDMA, or SDMA.

Figure 4B:
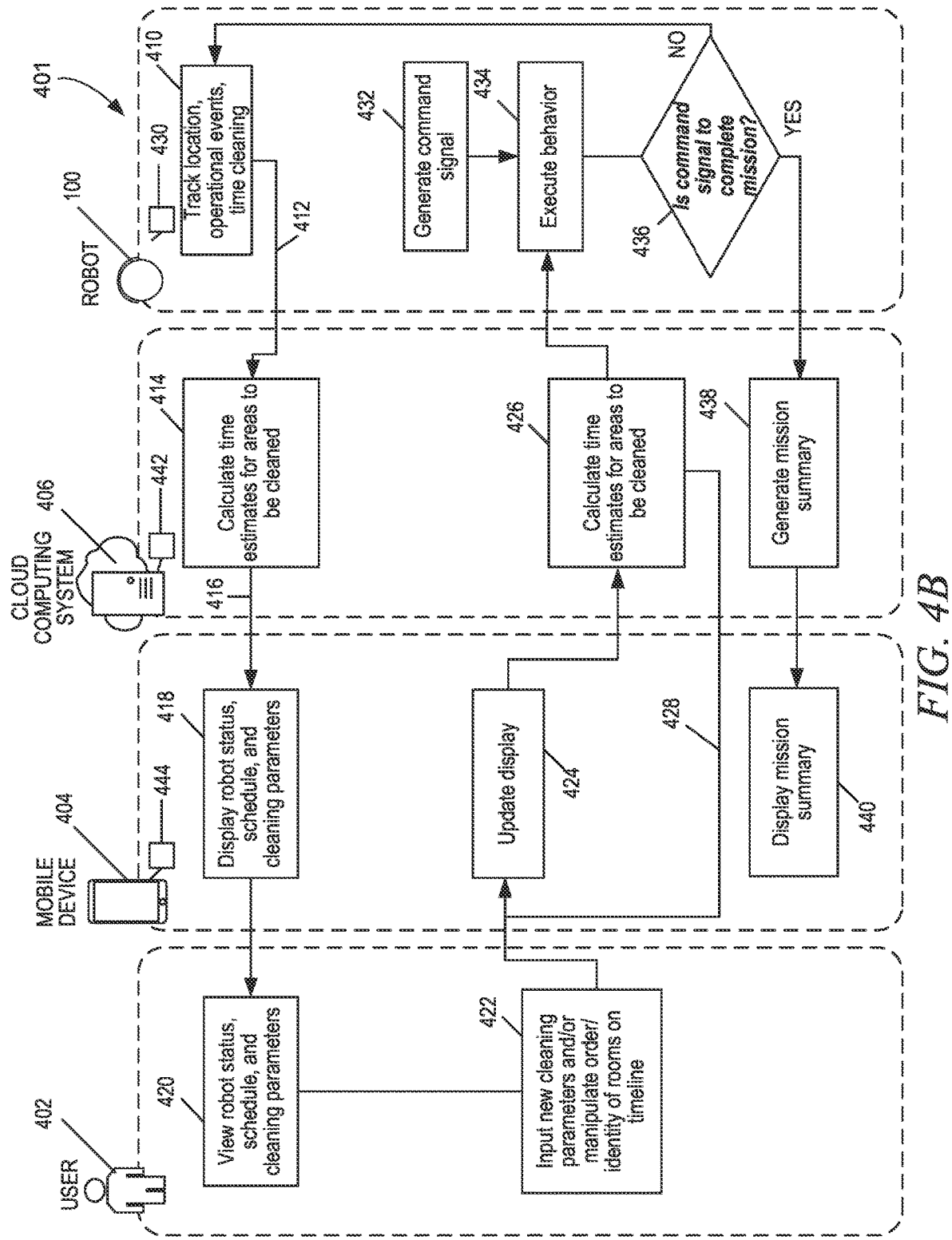
FIG. 4B illustrates a diagram illustrating an exemplary process of exchanging information between the mobile robot and other devices in a communication network.

FIG. 4B is a diagram illustrating an exemplary process 401 of exchanging information among devices in the communication network 410, including the mobile robot 100, the cloud computing system 406, and the mobile device 404.

In operation of some examples, a cleaning mission can be initiated by pressing a button on the mobile robot 100 (or the mobile device 404) or can be scheduled for a future time or day. The user can select a set of rooms to be cleaned during the cleaning mission or can instruct the robot to clean all rooms. The user can also select a set of cleaning parameters to be used in each room during the cleaning mission.

During a cleaning mission, the mobile robot 100 can track 410 its status, including its location, any operational events occurring during cleaning, and time spent cleaning. The mobile robot 100 can transmit 412 status data (e.g. one or more of location data, operational event data, time data) to the cloud computing system 406, which can calculate 414, such as by a processor 442, time estimates for areas to be cleaned. For example, a time estimate can be calculated for cleaning a room by averaging the actual cleaning times for the room that have been gathered during one or more prior cleaning mission(s) of the room. The cloud computing system 406 can transmit 416 time estimate data along with robot status data to the mobile device 404. The mobile device 404 can present 418, such as by a processor 444, the robot status data and time estimate data on a display. The robot status data and time estimate data can be presented on the display of the mobile device 404 as any of a number of graphical representations editable mission timeline or a mapping interface.

A user 402 can view 420 the robot status data and time estimate data on the display and can input 422 new cleaning parameters or can manipulate the order or identity of rooms to be cleaned. The user 402 can also delete rooms from a cleaning schedule of the mobile robot 100. In other instances, the user 402 can select an edge cleaning mode or a deep cleaning mode for a room to be cleaned.

The display of the mobile device 404 can be updated 424 as the user changes the cleaning parameters or cleaning schedule. For example, if the user changes the cleaning parameters from single pass cleaning to dual pass cleaning, the system will update the estimated time to provide an estimate based on the new parameters. In this example of single pass cleaning vs. dual pass cleaning, the estimate would be approximately doubled. In another example, if the user removes a room from the cleaning schedule, the total time estimate is decreased by approximately the time needed to clean the removed room. Based on the inputs from the user 402, the cloud computing system 406 can calculate 426 time estimates for areas to be cleaned, which can then be transmitted 428 (e.g. by a wireless transmission, by applying a protocol, by broadcasting a wireless transmission) back to the mobile device 404 and displayed. Additionally, data relating to the calculated time 426 estimates can be transmitted 446 to a controller 430 of the robot. Based on the inputs from the user 402, which are received by the controller 430 of the mobile robot 100, the controller 430 can generate 432 a command signal. The command signal commands the mobile robot 100 to execute 434 a behavior, such as a cleaning behavior. As the cleaning behavior is executed, the controller 430 can continue to track 410 a status of the robot 100, including its location, any operational events occurring during cleaning, or a time spent cleaning. In some instances, live updates relating to a status of the robot 100 can be additionally provided via push notifications to the mobile device 404 or a home electronic system (e.g. an interactive speaker system).

Upon executing a behavior 434, the controller 430 can check 436 to see if the received command signal includes a command to complete the cleaning mission. If the command signal includes a command to complete the cleaning mission, the robot can be commanded to return to its dock and upon return can transmit information to enable the cloud computing system 406 to generate 438 a mission summary which can be transmitted to, and displayed 440 by, the mobile device 404. The mission summary can include a timeline or a map. The timeline can display, the rooms cleaned, a time spent cleaning each room, operational events tracked in each room, etc. The map can display the rooms cleaned, operational events tracked in each room, a type of cleaning (e.g. sweeping or mopping) performed in each room, etc.

In some examples, communications can occur between the mobile robot 100 and the mobile device 404 directly. For example, the mobile device 404 can be used to transmit one or more instructions through a wireless method of communication, such as Bluetooth or Wi-fi, to instruct the mobile robot 100 to perform a cleaning operation (mission).

Operations for the process 401 and other processes described herein, such one or more steps discussed with respect to FIGS. 8A-10C can be executed in a distributed manner. For example, the cloud computing system 406, the mobile robot 100, and the mobile device 404 can execute one or more of the operations in concert with one another. Operations described as executed by one of the cloud computing system 406, the mobile robot 100, and the mobile device 404 are, in some implementations, executed at least in part by two or all of the cloud computing system 406, the mobile robot 100, and the mobile device 404.

Figure 5:
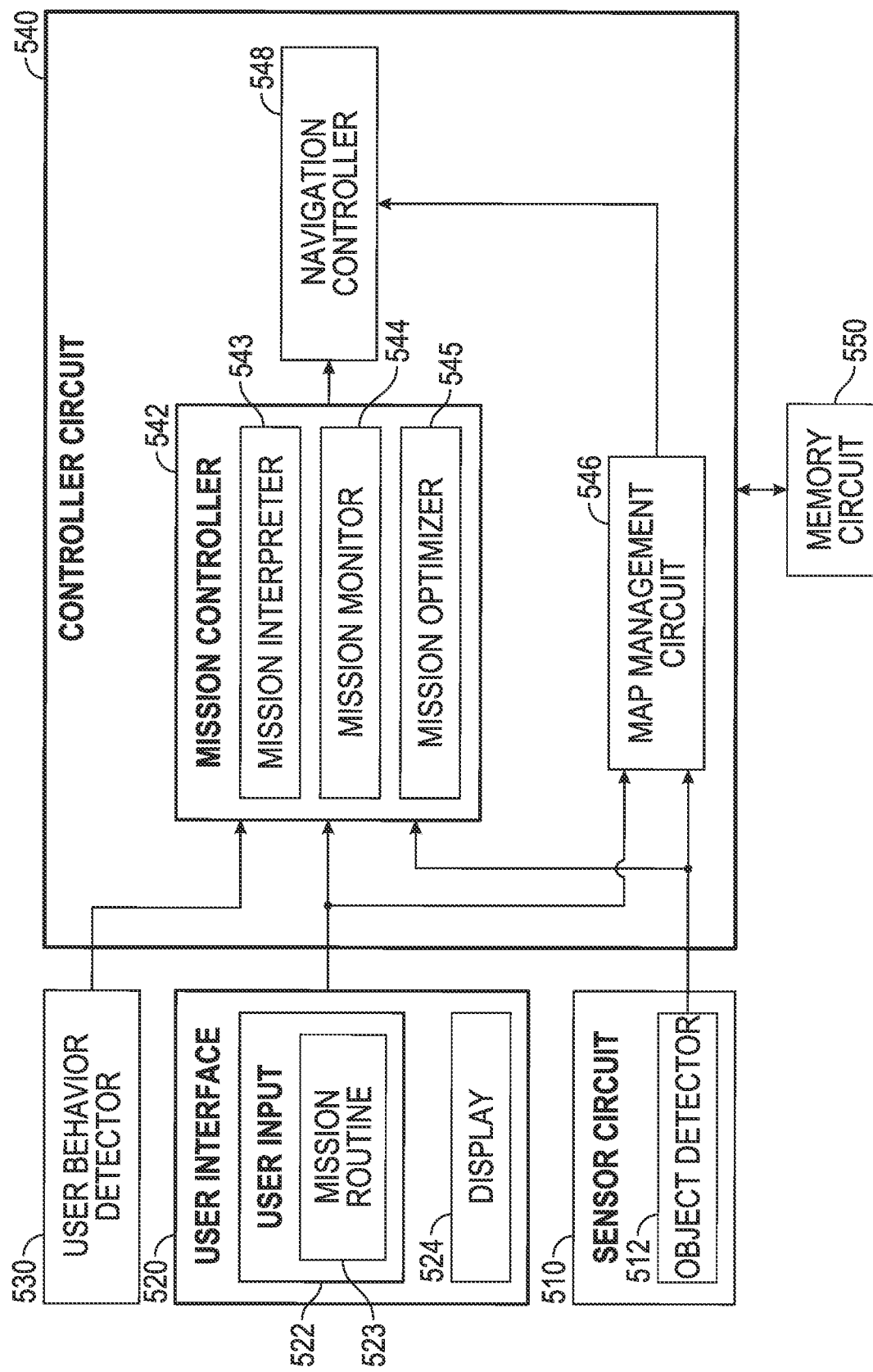
FIG. 5 illustrates a block diagram of a robot scheduling and controlling system.

FIG. 5 is a diagram of a robot scheduling and controlling system 500 configured to generate and manage a mission routine for a mobile robot (e.g., the mobile robot 100), and control the mobile robot to execute the mission in accordance with the mission routine. The robot scheduling and controlling system 500, and methods of using the same, as described herein in accordance with various embodiments, can be used to control one or more mobile robots of various types, such as a mobile cleaning robot, a mobile mopping robot, a lawn mowing robot, or a space-monitoring robot.

The system 500 can include a sensor circuit 510, a user interface 520, a user behavior detector 530, a controller circuit 540, and a memory circuit 550. The system 500 can be implemented in one or more of the mobile robot 100, the mobile device 404, the autonomous robot 408, or the cloud computing system 406. In an example, some or all of the system 500 can be implemented in the mobile robot 100. Some or all of the system 500 can be implemented in a device separate from the mobile robot 100, such as a mobile device 404 (e.g., a smart phone or other mobile computing devices) communicatively coupled to the mobile robot 100. For example, the sensor circuit 510 and at least a portion of the user behavior detector 530 can be included the mobile robot 100. The user interface 520, the controller circuit 540, and the memory circuit 550 can be implemented in the mobile device 404. The controller circuit 540 can execute computer-readable instructions (e.g., a mobile application, or "app") to perform mission scheduling and generating instructions for controlling the mobile robot 100. The mobile device 404 can be communicatively coupled to the mobile robot 100 via an intermediate system such as the cloud computing system 406, as illustrated in FIGS. 4A and 4B. Alternatively, the mobile device 404 can communication with the mobile robot 100 via a direct communication link without an intermediate device of system.

The sensor circuit 510 can include one or more sensors including, for example, optical sensors, cliff sensors, proximity sensors, bump sensors, imaging sensor, or obstacle detection sensors, among other sensors such as discussed above with reference to FIGS. 2A-2B and 3. Some of the sensors can sense obstacles (e.g., occupied regions such as walls) and pathways and other open spaces within the environment. The sensor circuit 510 can include an object detector 512 configured to detect an object in a robot environment, and recognize it as, for example, a door, or a clutter, a wall, a divider, a furniture (such as a table, a chair, a sofa, a couch, a bed, a desk, a dresser, a cupboard, a bookcase, etc.), or a furnishing element (e.g., appliances, rugs, curtains, paintings, drapes, lamps, cooking utensils, built-in ovens, ranges, dishwashers, etc.), among others.

The sensor circuit 510 can detect spatial, contextual, or other semantic information for the detected object. Examples of semantic information can include identity, location, physical attributes, or a state of the detected object, spatial relationship with other objects, among other characteristics of the detected object. For example, for a detected table, the sensor circuit 510 can identify a room or an area in the environment that accommodates the table (e.g., a kitchen). The spatial, contextual, or other semantic information can be associated with the object to create a semantic object (e.g., a kitchen table), which can be used to create an object-based cleaning mission routine, as to be discussed in the following.

The user interface 520, which can be implemented in a handheld computing device such as the mobile device 404, includes a user input 522 and a display 524. A user can use the user input 522 to create a mission routine 523. The mission routine 523 can include data representing an editable schedule for at least one mobile robot to performing one or more tasks. The editable schedule can include time or order for performing the cleaning tasks. In an example, the editable schedule can be represented by a timeline of tasks. The editable schedule can optionally include time estimates to complete the mission, or time estimates to complete a particular task in the mission. The user interface 520 can include user interface controls that enable a user to create or modify the mission routine 523. In some examples, the user input 522 can be configured to receive a user's voice command for creating or modifying a mission routine. The handheld computing device can include a speech recognition and dictation module to translate the user's voice command to device-readable instructions which are taken by the controller circuit 540 to create or modify a mission routine.

The display 524 can present information about the mission routine 523, progress of a mission routine that is being executed, information about robots in a home and their operating status, and a map with semantically annotated objects, among other information. The display 524 can also display user interface controls that allow a user to manipulate the display of information, schedule and manage mission routines, and control the robot to execute a mission. Examples of the user interface 520 are discussed below.

The controller circuit 540, which is an example of the controller 212, can interpret the mission routine 523 such as provided by a user via the user interface 520, and control at least one mobile robot to execute a mission in accordance with the mission routine 523. The controller circuit 540 can create and maintain a map including semantically annotated objects, and use such a map to schedule a mission and navigate the robot about the environment. In an example, the controller circuit 540 can be included in a handheld computing device, such as the mobile device 404. Alternatively, the controller circuit 540 can be at least partially included in a mobile robot, such as the mobile robot 100. The controller circuit 540 can be implemented as a part of a microprocessor circuit, which can be a dedicated processor such as a digital signal processor, application specific integrated circuit (ASIC), microprocessor, or other type of processor for processing information including physical activity information. Alternatively, the microprocessor circuit can be a processor that can receive and execute a set of instructions of performing the functions, methods, or techniques described herein.

The controller circuit 540 can include circuit sets comprising one or more other circuits or sub-circuits, such as a mission controller 542, a map management circuit 546, and a navigation controller 548. These circuits or modules can, alone or in combination, perform the functions, methods, or techniques described herein. In an example, hardware of the circuit set can be immutably designed to carry out a specific operation (e.g., hardwired). In an example, the hardware of the circuit set can include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components can be used in more than one member of more than one circuit set. For example, under operation, execution units can be used in a first circuit of a first circuit set at one point in time and reused by a second circuit in the first circuit set, or by a third circuit in a second circuit set at a different time.

The mission controller 542 can receive the mission routine 523 from the user interface 520. As discussed above, the mission routine 523 includes data representing an editable schedule, including at least one of time or order, for performing one or more tasks. In some examples, the mission routine 523 can represent a personalized mode of executing a mission routine. For a mobile cleaning robot, examples of a personalized cleaning mode can include a "standard clean", a "deep clean", a "quick clean", a "spot clean", or an "edge and corner clean". Each of these mission routines defines respective rooms or floor surface areas to be cleaned and an associated cleaning pattern. For example, a standard clean routine can include a broader range of areas in the user's home environment, such as all the rooms, than a quick clean routine. A deep clean routine can include one or more repeated cleaning zones that include multiple passes over the same area, or for an extended period of cleaning time, or an application of a higher cleaning power. The personalized cleaning mode can be created or modified manually by the user such as via the user interface 520, or automatically triggered by an event such as detected by the user behavior detector 530. In an example, the controller circuit 540 can communicate with a light source to automatically adjust illumination of the target rooms or floor areas, and navigate the mobile cleaning robot to clean the target rooms or floor areas with the adjusted illumination. For example, for a "deep clean routine", the controller circuit 540 can automatically trigger the light switch to increase illumination of the room or area to be cleaned, and the navigation controller 548 can navigate the mobile cleaning robot to the illuminated rooms or areas to perform cleaning in accordance with the deep clean routine.

The mission routine 523, such as a personalized cleaning mode (e.g., a deep clean mode), can include one or more tasks characterized by respective spatial or contextual information of an object in the environment, or one or more tasks characterized by a user's experience such as the use's behaviors or routine activities in association with the use of a room or an area in the environment. The mission controller 542 can include a mission interpreter 543 to extract from the mission routine 523 information about a location for the mission (e.g., rooms or area to be clean with respect to an object detected in the environment), time and/or order for executing the mission with respect to user experience, or a manner of cleaning the identified room or area. The mission interpreter 543 can interpret the mission routine using information of the objects detected by the object detector 512 and semantics of the object, user behaviors detected by the user behavior detector 530, or map generated and maintained by the map management circuit 546.

Compared to location-and-map based mission, the contextual and user experience-based mission routine can be architected to add a user's personalized content. As the contextual and user experience-based mission routine is more consistent with natural language description of a mission, it can enable more intuitive communication between the user and the robot, allowing the mobile robot to execute the mission in a commonly understandable fashion between the user and the robot. Additionally, the inclusion of the contextual information and user experience in mission description enriches the content of a mission routine, adds more intelligence to robot behavior, and enhances user experience of personalized control of the mobile robot. Examples of contextual and user experience-based mission routines, and interpretation of mission routine by the mission interpreter 543, are discussed below.

The mission monitor 544 can monitor the progress of a mission. In an example, the mission monitor 544 can generate a mission status report showing the completed tasks (e.g., rooms that have cleaned) and tasks remaining to be performed (e.g., rooms to be cleaned according to the mission routine). In an example, the mission status report can include an estimate of time for completing the mission, elapsed time for the mission, time remaining for the mission, an estimate of time for completing a task in a mission, elapsed time for a task in the mission, or time remaining for a task in the mission. The estimation of time for completing the entire mission or a task in the mission can be based on a characteristic of the environment, such as approximate square footage or area measurement of the space to be cleaned, number of rooms to be traversed, debris status, or a level of dirtiness of the one or more target areas, such as detected by the sensor circuit 510. Additionally, or alternatively, the estimation of time can be based on historical mission completion time, or a test ran through all rooms for purposes of calculating time estimates.

The mission optimizer 545 can pause, abort, or modify a mission routine or a task therein such in response to a user input or a trigger event. The mission modification can be carried out during the execution of the mission routine. Examples of mission modification can include adding a new task to the mission, removing an existing from the mission, or prioritizing one or more tasks in the mission (e.g., change the order of the tasks, such as cleaning certain "hotspots" such as dirtier areas before other areas in a home). The trigger event that causes the mission optimizer 545 to modify time or order of the tasks in a mission can be a specific type of user behavior, such as room occupancy indicating a presence or absence of a person in a room. The room occupancy can be detected by the behavior detector 530, such as communicatively coupled to a security camera in the room. Alternatively, the room occupancy can be detected by the object detector 512 coupled to a sensor included in a mobile robot. To execute a user experience-based mission routine or task such as "clean the living room when it is unoccupied", in response to a detection of an occupied room, the controller circuit 540 can pause the mission, or modify the mission routine, such as by rescheduling or postponing the task scheduled to be performed in the occupied room until it is no long occupied, or as instructed by a user.

Another example of the user behavior includes user engagement in an audio-sensitive event, such as on a phone call, watching TV, listening to music, or having a conversation. The audio-sensitive event can be detected by the behavior detector 530, such as communicatively coupled to an audio sensor. To execute a user experience-based mission routine or task such as "don't clean when I'm watching TV." The controller circuit 540 can pause the mission, or modify the mission routine such as by rescheduling or postponing the task that interferes with the audio-sensitive event until the audio-sensitive event is over, or as instructed by a user.

In some examples, the mission optimizer 545 can receive a time allocation for completing a mission, and prioritize one or more tasks in the mission routine based on the time allocation. To execute a user experience-based mission routine or task such as "clean as many rooms as possible within next hour", the mission monitor 544 can estimate time for completing individual tasks in the mission (e.g., time required for cleaning individual rooms), such as based on room size, room dirtiness level, or historical mission or task completion time. The optimizer 545 can modify the mission routine by identifying and prioritizing those tasks that can be completed within the allocated time.

The map management circuit 546 can generate and maintain a map of the environment or a portion thereof. In an example, the map management circuit 546 can generate a semantically annotated object by associating an object, such as detected by the object detector 512, with semantic information, such as spatial or contextual information. Examples of the semantic information can include location, an identity, or a state of an object in the environment, or constraints of spatial relationship between objects, among other object or inter-object characteristics. The semantically annotated object can be graphically displayed on the map, thereby creating a semantic map. The semantic map can be used for mission control by the mission controller 542, or for robot navigation control by the navigation controller 548. The semantic map can be stored in the memory circuit 550.

In some examples, the map management circuit 546 can determine that the detected object indicates that the map requires an update. For example, the map management circuit 546 can associate the detected object with a behavior to apply a keep out zone to the map. The map management circuit 546 can then update the map to allow the navigation controller 548 to avoid the keep out zone during its mission and in future missions. Objects indicating such behaviors are discussed in detail below with respect to FIGS. 8A-10C Semantic annotations can be added for an object algorithmically. In an example, the map management circuit 546 can employ SLAM techniques to detect, classify, or identify an object, determine a state or other characteristics of an object using sensor data (e.g., image data, infrared sensor data, or the like). Other techniques for feature extraction and object identification can be used, such as geometry algorithms, heuristics, or machine learning algorithms to infer semantics from the sensor data. For example, the map management circuit 546 can apply image detection or classification algorithms to recognize an object of a particular type, or analyze the images of the object to determine a state of the object (e.g., a door being open or closed, or locked or unlocked). Alternatively, or additionally, semantic annotations can be added by a user via the user interface 520. Identification, attributes, state, among other characteristics and constraints, can be manually added to the semantic map and associated with an object by a user.

The navigation controller 548 can navigate the mobile robot to conduct a mission in accordance with the mission routine. In an example, the mission routine can include a sequence of rooms or floor surface areas to be cleaned by a mobile cleaning robot. The mobile cleaning robots can have a vacuum assembly (such as the vacuum assembly 118) and can use suction to ingest debris as the mobile cleaning robot (such as the robot 100) traverses the floor surface (such as the surface 50). In another example, the mission routine can include a sequence of rooms or floor surface areas to be mopped by a mobile mopping robot. The mobile mopping robot can have a cleaning pad for wiping or scrubbing the floor surface. In some examples, the mission routine can include tasks scheduled to be executed by two mobile robots sequentially, intertwined, in parallel, or in another specified order or pattern. For example, the navigation controller 548 can navigate a mobile cleaning robot to vacuum a room, and navigate a mobile mopping robot to mop the room that has been vacuumed.

In an example, the mission routine can include one or more cleaning tasks characterized by, or made reference to, spatial or contextual information of an object in the environment, such as detected by the object detector 512. In contrast to a room-based cleaning mission that specifies a particular room or area (e.g., as shown on a map) to be cleaned by the mobile cleaning robot, an object-based mission can include a task that associates an area to be cleaned with an object in that area, such as "clean under the dining table", "clean along the kickboard in the kitchen", "clean near the kitchen stove", "clean under the living room couch", or "clean the cabinets area of the kitchen sink", etc. As discussed above with reference to FIG. 5, the sensor circuit 510 can detect the object in the environment and the spatial and contextual information association with the object. The controller circuit 540 can create a semantically annotated object by establishing an association between the detected object and the spatial or contextual information, such as using a map created and stored in the memory circuit 550. The mission interpreter 543 can interpret the mission routine to determine the target cleaning area with respect to the detected object, and navigate the mobile cleaning robot to conduct the cleaning mission.

In some examples, the object referenced in a mission routine can include debris status in a room or an area. An exemplary mission routine can include "clean the dirty areas." The object detector 512 can detect debris status, or a level of dirtiness. The controller circuit 540 can prioritize cleaning of the one or more rooms or floor surface areas by respective dirtiness levels. For example, a mission routine can include a first area having a higher level of dirtiness than a second area, which has a higher level of dirtiness than a third area. The controller circuit 540 can prioritize the mission tasks such that the first area gets cleaned first, following by the second area, followed by the third area. The controller circuit 540 can additionally or alternatively prioritize cleaning of the one or more rooms or floor surface areas by respective debris distributions in those rooms or areas. A room with more widely spread debris (i.e., a higher spatial distribution) has a lower priority in the mission routine, and gets cleaned later, than a room with more spatially concentrated debris.

In an example, the mission routine can be characterized by, or made reference to, user experience of using a room or an object therein. The user experience represents a personalized manner of interaction with a room or an object therein. Examples of the user experience can include a user's time, pattern, frequency, or preference of using a room or an area in the environment, or a user's behavior or daily routine associated with use, non-use, or a manner of use of a room or an area in the environment. In an example, the experience-based mission routine can include an "after dinner clean routine" that defines cleaning tasks with regard to areas likely to be affected by preparation and serving of dinner, such as a kitchen floor and floor areas around the dining table. In another example, the experience-based mission routine can include an "after shower clean routine" that defines cleaning tasks with regard to areas likely to be affected by a user taking a shower, such as a bathroom floor. In some examples, the user experience-based mission routine can be defined with respect to user's activity or daily routine. For example, the experience-based mission routine can include "clean all rooms after I leave the house", or "clean the living room before I get home".

Execution of the user experience-based mission routine can be activated or modified manually by a user, such as via the user interface 520. For example, a user can manually initiate the "after dinner clean routine" after the dinner, or the "after shower clean routine" after the shower. Examples of the user interface 520 and user interface controls for creating, activating, monitoring, or modifying a mission routine are discussed below. Additionally, the user experience-based mission routine can be automatically activated in response to a detection of user behavior, such as by the user behavior detector 530. As illustrated in FIG. 5, the user behavior detector 530 can be configured to detect user behavior associated with the use, non-use, or a manner of use of a room or an area in the environment. In an example, the user behavior detector 530 can be communicatively coupled to one or more sensors including, for example, ambulatory sensors (e.g., the sensors included in the mobile robot, such as a camera), or stationary sensors positioned in rooms or appliances, such as in a smart home ecosystem. For example, the controller circuit 540 can activate the "after dinner clean routine" in response to a detection of a dishwasher being turned on, such as via a sensor on the dishwasher. In another example, the controller circuit 540 can activate the "clean all rooms after I leave the house" in response to a detection of locking of an entry door or closing of a garage door, such as via a smart door lock sensor. In another example, the user behavior detector 530 can request and establish a communication with to a user's digital calendar (such as one stored in the user's mobile phone), and retrieve user daily schedule therefrom. The controller circuit 540 can activate or modify the mission based on the schedules of calendar events. For example, a calendar event of a doctor's appointment at a particular time slot can indicate the user's absence from home, and the controller circuit 540 can active the mission of "clean all rooms after I leave the house" during the time of that calendar event.

Barrier Examples

Figure 6A:
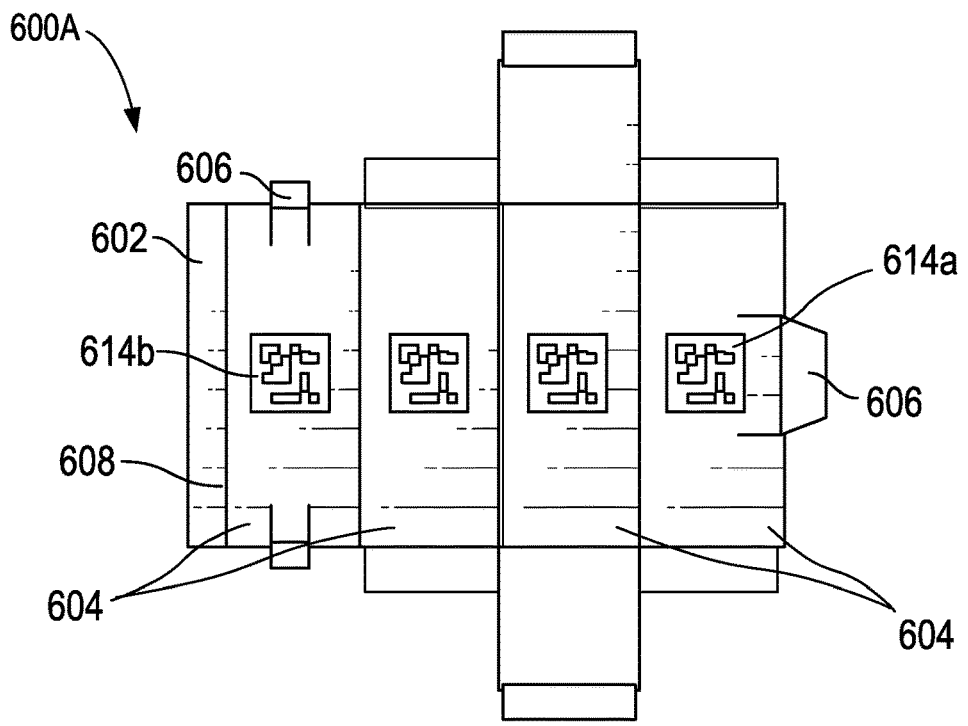
FIG. 6A illustrates a top view of a disposable tower prior to assembly.
Figure 6B:
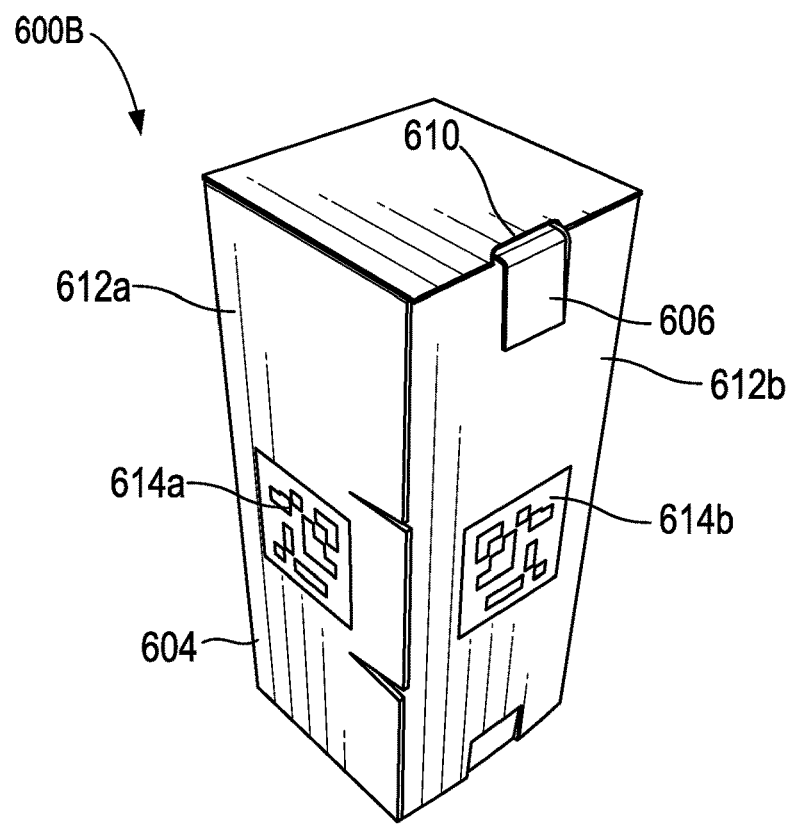
FIG. 6B illustrates a perspective view of an assembled disposable tower.

FIG. 6A illustrates a top view of a disposable tower 600A prior to assembly. FIG. 6B illustrates a perspective view of an assembled disposable tower 600B. FIGS. 6A and 6B are discussed together below. The tower 600A can include a sheet of material 602 defining segments 604 and tabs 606.

The sheet 602 can be a relatively flat sheet made of materials such as one or more of paper, plastic, foams, metals, or the like. In some examples, the sheet 602 can be made of a relatively light weight and inexpensive material such as cardboard. The sheet 602 can be a portion of packaging provided with the robot 100 in some examples. The segments 604 and the tabs 606 can be separated by seams 608, which can be folds or creases where the seams 608 can have a thickness smaller than that of the segments 604.

During assembly, a user can fold the segments 604 along the seams 608 and secure the tabs 606 within slots 610 to form the tower 600B, as shown in FIG. 6B. When the segments 604 are secured to each other using the tabs 606, the segments 604 can form walls, such as a first wall 612a and a second wall 612b. The walls 612a and 612b can include visual fiducials (or visual indicators) 614a and 614b, respectively.

The visual fiducials 614 can be passive fiducials or indicators such as a bar code, a matrix code, serial number, or other visual identifier. The fiducials 614 can be two dimensional or three dimensional. Examples of the matrix code can include an April Tag and a QR code. In some examples, the visual fiducials 614 can be one or more retroreflective fiducials (such as one or more retroreflective matrix code) to help allow the robot 100 to detect the visual fiducials 614 using infrared light. As shown in FIG. 6A, the visual fiducials 614 can be located on each segment 604. The segments 604 can include more than one visual fiducial 614 in some examples.

The visual fiducial 614a can be located on the wall 612a near a center of the wall and can be surrounded by blank space to help improve identification of the visual fiducial 614a by the camera 140 of the robot 100. The visual fiducial 614 can be included on all of the walls of the tower 600B in some examples, including a base and a top of the tower 600B, which can help the robot 100 identify the visual fiducial 614 from multiple directions.

Figure 7A:
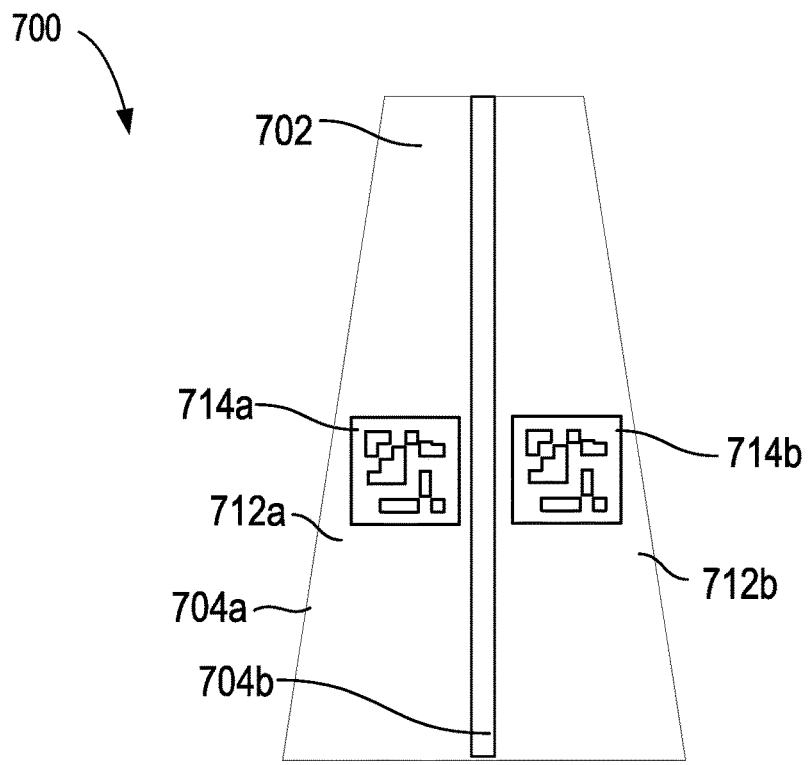
FIG. 7A illustrates a front view of a disposable tower.
Figure 7B:
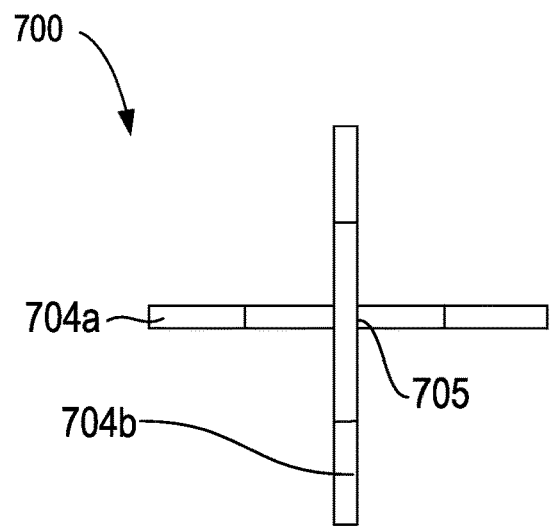
FIG. 7B illustrates a top view of a disposable tower.

FIG. 7A illustrates a front view of a disposable tower 700. FIG. 7B illustrates a top view of the disposable tower 700. FIGS. 7A and 7B are discussed together below.

The disposable tower 700 can include a sheet 702, which can be used to form sections 704a and 704b. The section 704b can include a slot 705 to receive the section 704a therein to form the tower as shown in FIGS. 7A and 7B, which can include walls 712a and 712b. Because the tower 700 is made of only two pieces, the tower 700 can be relatively fast to assemble and inexpensive to manufacture.

The sections 704 can form four pairs of parallel walls, each divided by an opposing section. For example, the walls 712a and 712b are parallel and divided by the section 704b. The walls 712a and 712b can include visual fiducials (or visual indicators) 714a and 714b, respectively, which can be similar to the visual fiducials 614a and 614b discussed above. Because the tower 700 can include four pairs of parallel walls, the tower 700 can include 8 visual indicators (or more), which can help the robot identify the visual indicators 714 from various angles.

Visual Indicator Use Examples

Figure 8A:
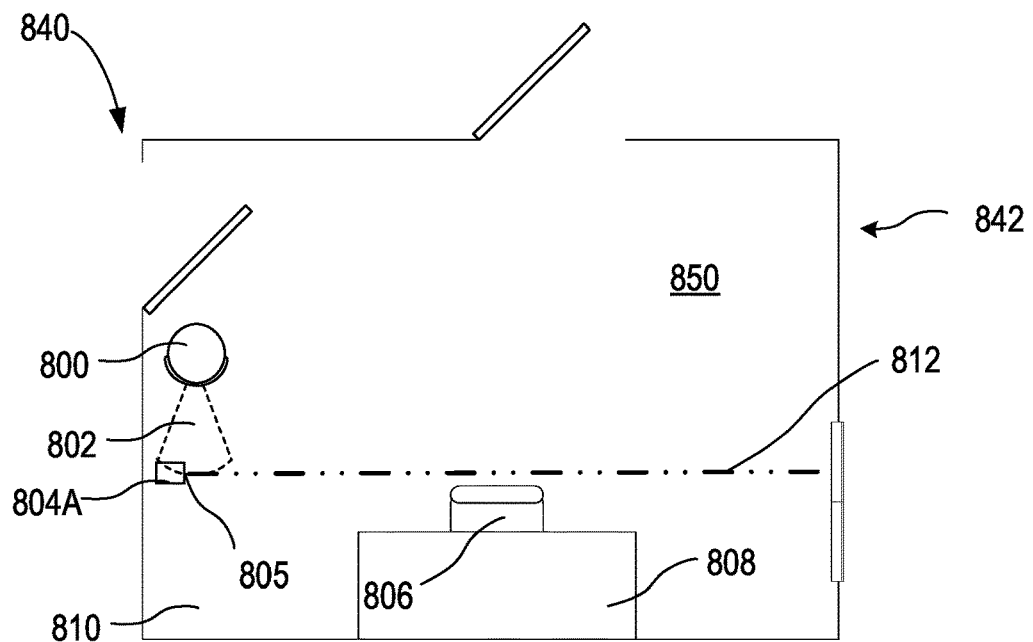
FIG. 8A illustrates a plan view of a mobile cleaning robot in an environment.

FIG. 8A illustrates a plan view of a mobile cleaning robot 800 in an environment 840. The environment 840 can include a room 842, where the room 842 can include a floor surface 850. The robot 800 can be similar to the robot 100 discussed above and can produce a field of view 802 from a camera (such as the camera 140) of the robot 800.

A tower 804 can be located within the room 842 of the environment 840 and can be located on the floor surface 850. The tower 804 can be located near an edge of a chair 806 that can be located near a desk 808. The tower 804 can include a visual passive fiducial or indicator thereon that can be detected by the robot 800 when the tower 804 is within the field of view 802 of the camera of the robot 800.

More specifically, processing circuitry in communication with (or within) the robot 800 and in communication with the camera of the robot 100 can be configured to produce an image output based on the optical field of view 802 of the camera. The processing circuitry can be configured to detect a visual fiducial (such as using VSLAM techniques) on the tower 804 that is in the image output produced by the camera. Once detected, the processing circuitry can perform a lookup of the visual fiducial (such as using a database or table) to determine a behavior modification based on the visual fiducial. For example, as shown in FIG. 8A, the visual fiducial of the tower 804A can indicate that there is a keep out zone 810 defined by the virtual barrier 812.

The virtual barrier 812 can be a linear barrier that the robot 800 will not cross. The linear barrier 812 can be indicated to the robot 800 by an orientation of the tower 804A. For example, the robot 800 can associate the indicator of the tower 804 with a virtual barrier 812 that can be perpendicular to a side 805 of the tower 804. The tower 804 can include indications of a direction of the virtual barrier such as lines or text. Further, a user interface in communication with the robot 800 can indicate to a user in which direction the virtual barrier will be indicated to the robot 800 by the tower 804.

When the processing circuitry of the robot 800 determines the behavior modification associated with the tower 804A, the processing circuitry of the robot 800 can update the map of the environment 840 to include the keep out zone 810 as indicated by the virtual barrier 812. The processing circuitry can then modify behavior of the robot 800 by controlling the robot 800 to not enter the keep out zone 810 (or not crossing the virtual barrier 812), which can help the robot 800 avoid the chair 806 and the desk 808 which can be a work area that may have several cables or cords, helping to reduce failed missions or cleaning routines.

The tower 804 can be used during a training period of the robot 800 before the map is completed where a user can select a training behavior of the tower 804 (such as by using a user interface or such as by selecting a tower indicating a desired behavior). The user can then position one or more tower 804 in the environment prior to the robot's first cleaning routine or mission in that environment 840 or room 842. The robot can sense the tower 804 during the mission and create the map incorporating the behavior modification (such as the keep out zone 810 of FIG. 8A). The user can then remove the tower 804 after the mission is complete (or following receipt of a notification indicating that the tower 804 can be removed). In this way, a user can easily establish keep out zones or other behavior modification zones prior to or during map creation using a disposable tower.

Figure 8B:
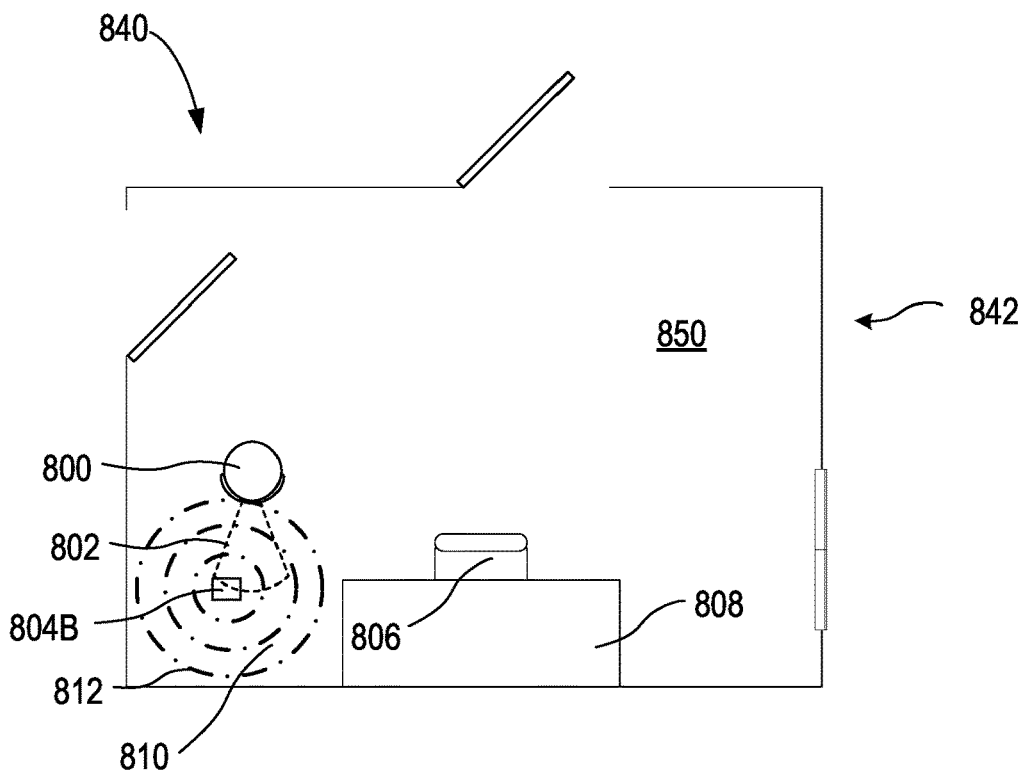
FIG. 8B illustrates a plan view of a mobile cleaning robot in an environment.

FIG. 8B illustrates a plan view of the mobile cleaning robot 800 in the environment 840 including a tower 804B placed within the environment. The tower 804B can be similar to the tower 804A, but the tower 804B can include a visual indicator that, when the tower 804B is in the field of view 802 of the robot 800, can cause processing circuitry of the robot 800 to indicate a keep out zone 810 illustrated by the virtual barrier 812 that is a radius. That is, the keep out zone 810 can be a radius around the tower of, for example, 10 centimeters (cm), 20 cm, 30 cm, 40 cm, 50 cm, cm, 70 cm, 80 cm, 90 cm, 1 meter, or the like. The processing circuitry can instruct the robot 800 to not enter the keep out zone 810 or to not cross the virtual barrier 812 and the processing circuitry can update the map to include the keep out zone 810.

In another example, the tower 804B can indicate a zone in need of additional or more frequent cleaning passes. In this case, the processing circuitry can update the map to include a hotspot (or dirtier area—such as an area near a desk paper shredder or garbage can). The processing circuitry can then modify missions including the room 842 to perform additional passes or spend additional time cleaning the hotspot. The processing circuitry can also update the map to include the hotspot. Once the map is updated, the processing circuitry can send a message to a user interface to notify the user that the tower 804B can be removed.

Figure 8C:
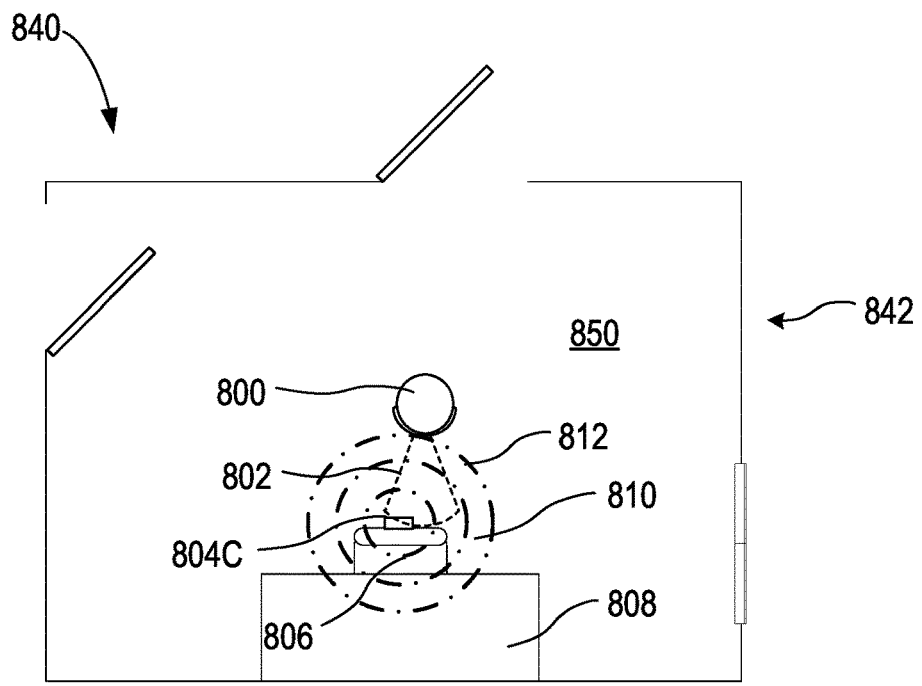
FIG. 8C illustrates a plan view of a mobile cleaning robot in an environment.

FIG. 8C illustrates a plan view of the mobile cleaning robot 800 in the environment 840 including a visual indicator 804C placed within the environment. The visual indicator 804C can be similar to the tower 804B, but the visual indicator 804C can be connected to the chair 806. The visual indicator 804C can include a fastener such as hook and loop fasteners, an adhesive, clip, or the like, that is configured to connect the visual indicator 804C to the chair 806 as long as is desired by the user. The visual indicator 804C can be a matrix code (similar to the visual indicators discussed above with respect to FIGS. 6A-7B) or can include one or more retroreflective fiducials that can help to limit visibility to a user or to a human while still allowing the robot 800 to detect the visual indicator 804C when the tower 804C is in the field of view 802 of the robot 800.

Upon detection of the visual indicator 804C by the robot 800, processing circuitry of the robot 800 can update its map or cleaning routine to note that there is a movable object in the environment with a keep out zone 810 as defined by a virtual barrier 812 that the robot 800 will not cross. The keep out zone 810 can be a radius around the tower 804C of, for example, 10 cm, 20 cm, 30 cm, 40 cm, 50 cm, 60 cm, cm, 80 cm, 90 cm, 1 meter, or the like.

Because the keep out zone 810 will potentially move within the environment, the processing circuitry can update a map or routine for the entire environment 840. Then, during operation of the robot 800, the processing circuitry can instruct the robot 800 to not enter the keep out zone 810 or to not cross the virtual barrier 812 any time the robot 800 detects the visual indicator 804C within the environment 840, regardless of the location of the visual indicator 804C within the environment 840. Such an indicator can help to allow the robot 800 to avoid objects that the user does not want the robot 800 to interact with in the environment 840 while still allowing the object to move within the environment 840. Because the indicator 804C can be a passive indicator, it can be relatively low cost and disposable, and can be easily securable to many items.

Figure 8D:
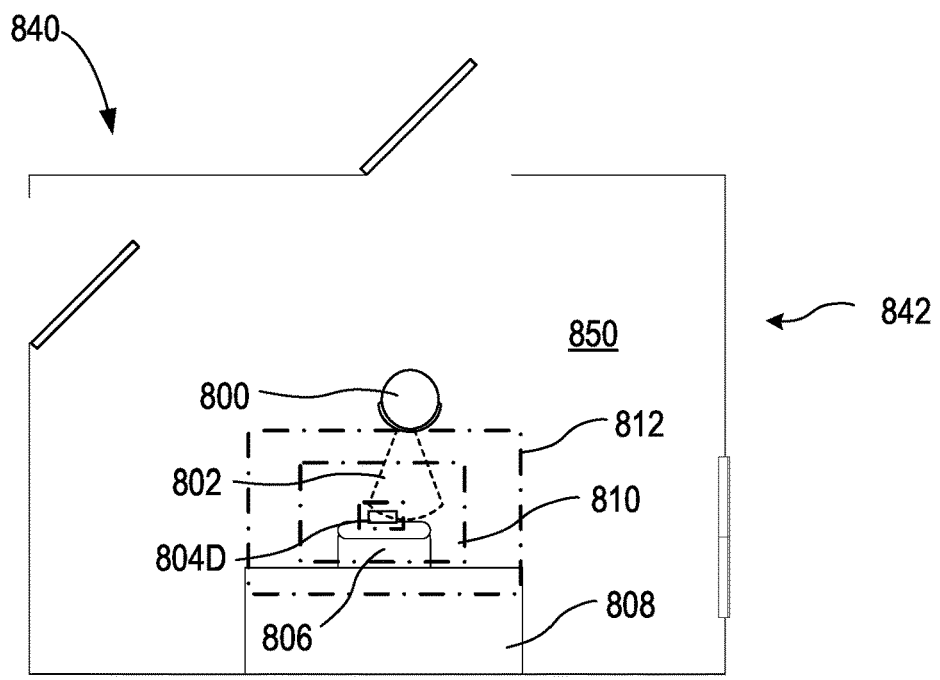
FIG. 8D illustrates a plan view of a mobile cleaning robot in an environment.

FIG. 8D illustrates a plan view of the mobile cleaning robot 800 in the environment 840 including a visual indicator 804D placed within the environment. The visual indicator 804D can be similar to the visual indicator 804C in that the visual indicator can indicate a movable object to the mobile robot 800, but the visual indicator 804D can indicate a keep out zone having a rectangular virtual barrier perimeter 812 and keep out zone 810. Any of the previously discussed indicators can have a rectangular perimeter or keep out zone. Though keep out zones discussed are rectangular or circular, the keep out zones can be any shape, such as triangular, pentagonal, hexagonal, octagonal, or the like. Though the keep out zones are shown as two dimensional, the keep out zones can also extend vertically off the floor surface (such as the surface 850).

Method Example

Figure 9:
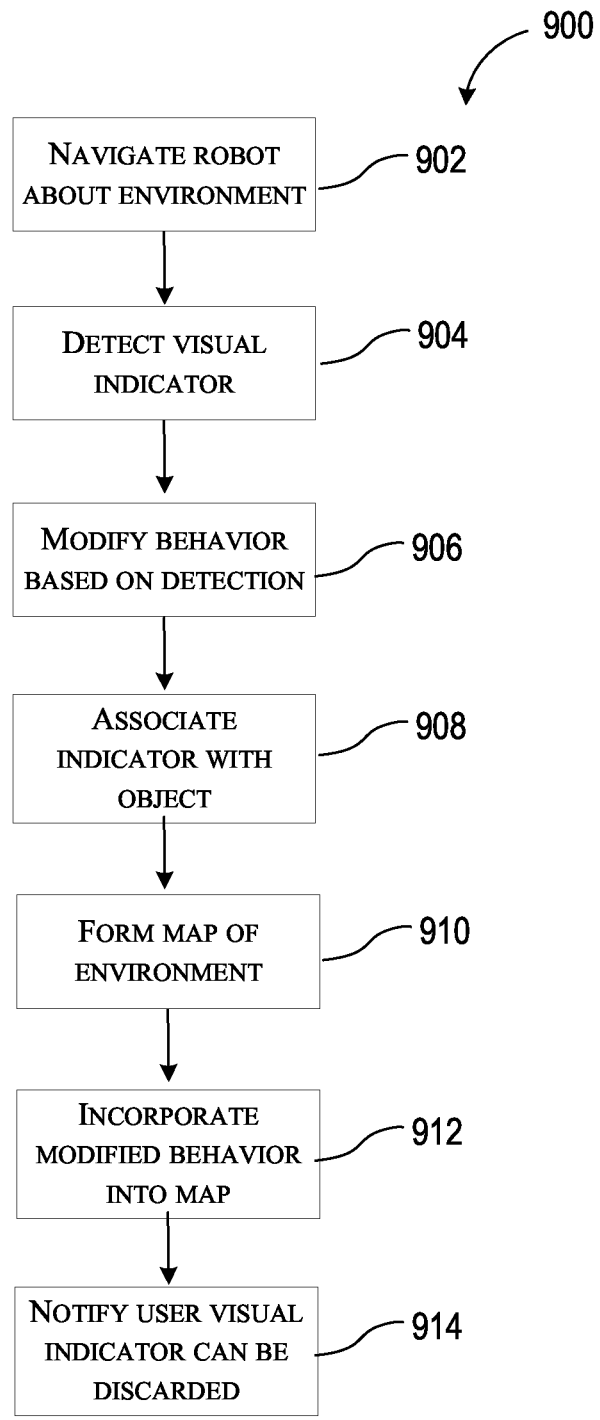
FIG. 9 illustrates a flow chart of a method.

FIG. 9 illustrates a schematic view of the method 900, in accordance with at least one example of this disclosure. The method 900 can be a method of operating a mobile cleaning robot within an environment. The steps or operations of the method 900 are illustrated in a particular order for convenience and clarity; many of the discussed operations can be performed in a different sequence or in parallel without materially impacting other operations. The method 900 as discussed includes operations performed by multiple different actors, devices, and/or systems. It is understood that subsets of the operations discussed in the method 900 can be attributable to a single actor, device, or system could be considered a separate standalone process or method.

The method 900 can begin at step 902 where a mobile robot can navigate about an environment prior to forming a map of the environment. For example, the mobile robot 800 can navigate the environment 840 before creating a map of the environment 840. At step 904, the mobile robot can detect a passive visual indicator within the environment. For example, the robot 800 can detect the tower 804A including a visual indicator (such as the indicator 614a of the tower 600).

At step 906, a cleaning behavior of the mobile cleaning robot can be modified in an area of the environment based on detection of the passive indicator. For example, a user can select a behavioral control (such as mechanically by selecting a passive visual fiducial) and can place the fiducial in the environment 840. The visual indicator or fiducial can indicate size of the behavior control zone. The robot 800 can avoid the keep out zone 810 by not crossing the virtual barrier 812 within the environment 840 based on detection of the indicator of the tower 804A. At step 908, the passive visual indicator can be associated with an object. For example, the mobile robot 800 can associate the chair 806 with the visual indicator 804C.

At step 910, a map of the environment can be formed. For example, the controller 212 of the robot 100 can form a map using SLAM, VSLAM, odometry, or the like. At step 912, after forming the map of the environment, the area corresponding to the modified cleaning behavior can be incorporated into the map. For example, after the map of the environment 840 is formed, the behavior avoiding the keep out zone 810 (of FIG. 8A) can be incorporated into the map of the room 842.

At step 914, a user can be notified that the map has been updated to incorporate the area corresponding to the modified cleaning behavior into the map or that the passive indicator can be discarded. For example, the robot 800 can communicate to the mobile device 404 that the map has been updated to incorporate the keep out zone 810 and the device 404 can produce a notification for the user 402. Also, the mobile device 404 can produce a notification for the user 402. One or more steps of the method 900 can be used with any of the devices or systems discussed herein.

User Interface Examples

Figure 10A:
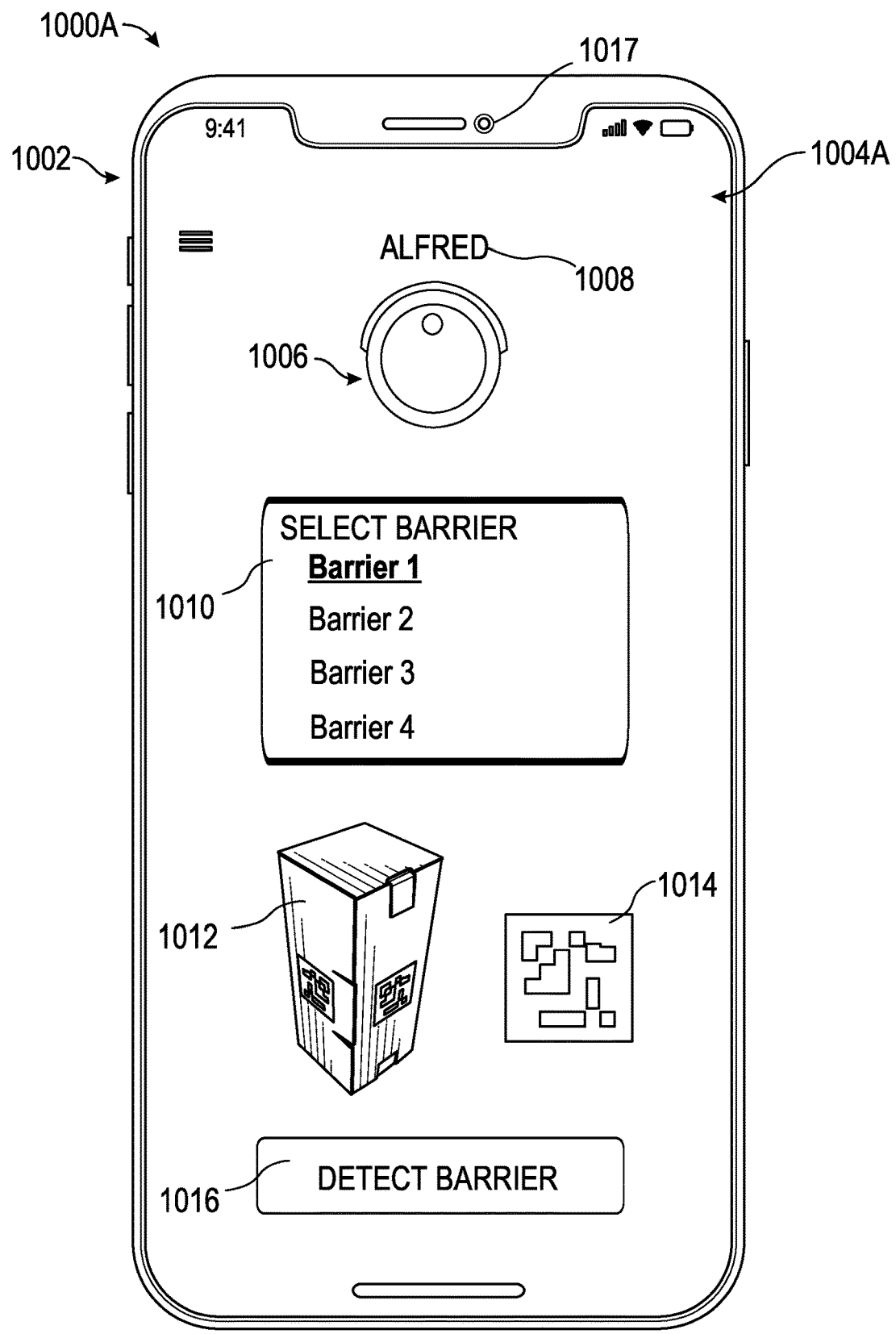
FIG. 10A illustrates a user interface of a handheld device that displays an image representing a mobile robot in a user's home.
Figure 10B:
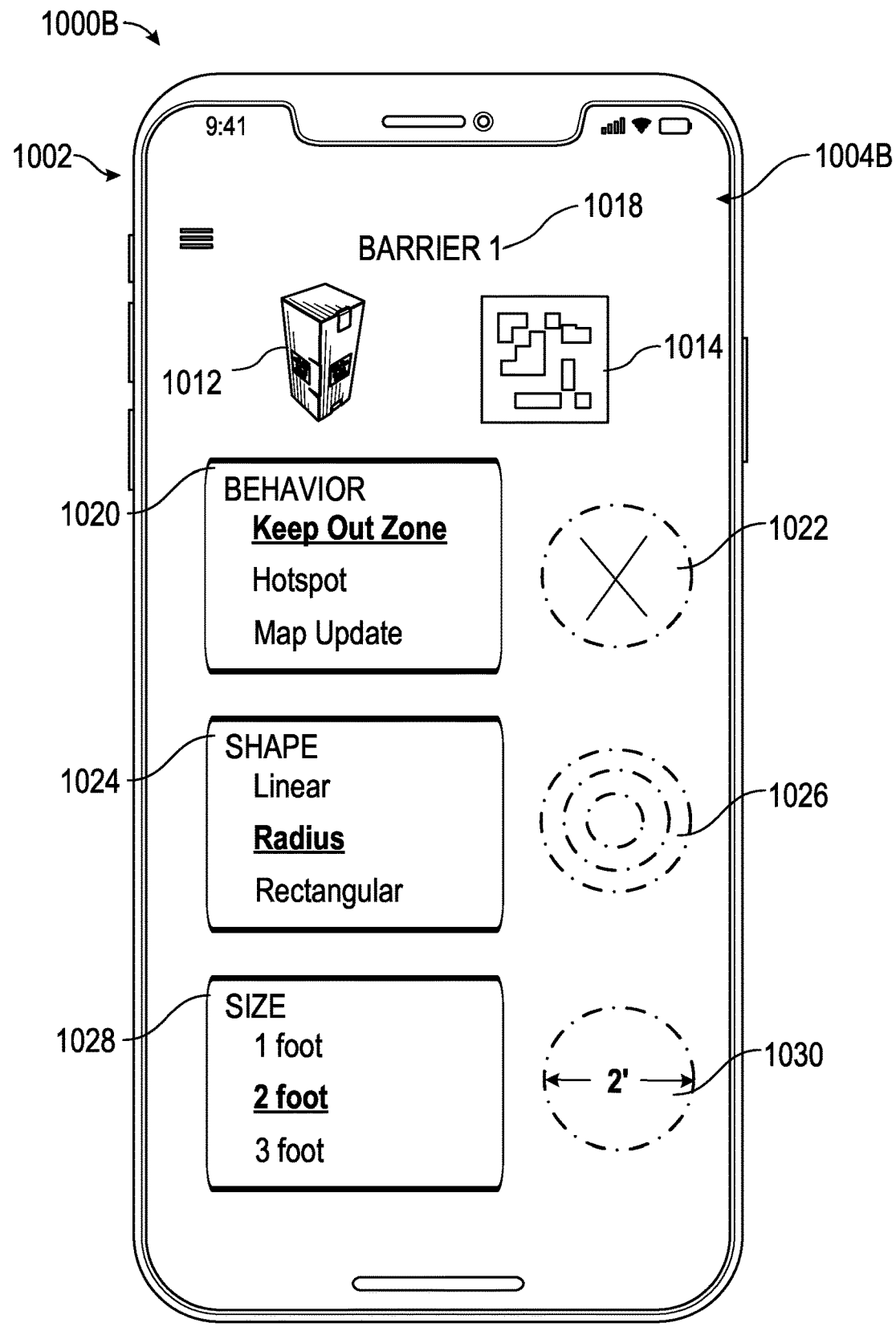
FIG. 10B illustrates a user interface of a handheld device that displays an image representing a mobile robot in a user's home.
Figure 10C:
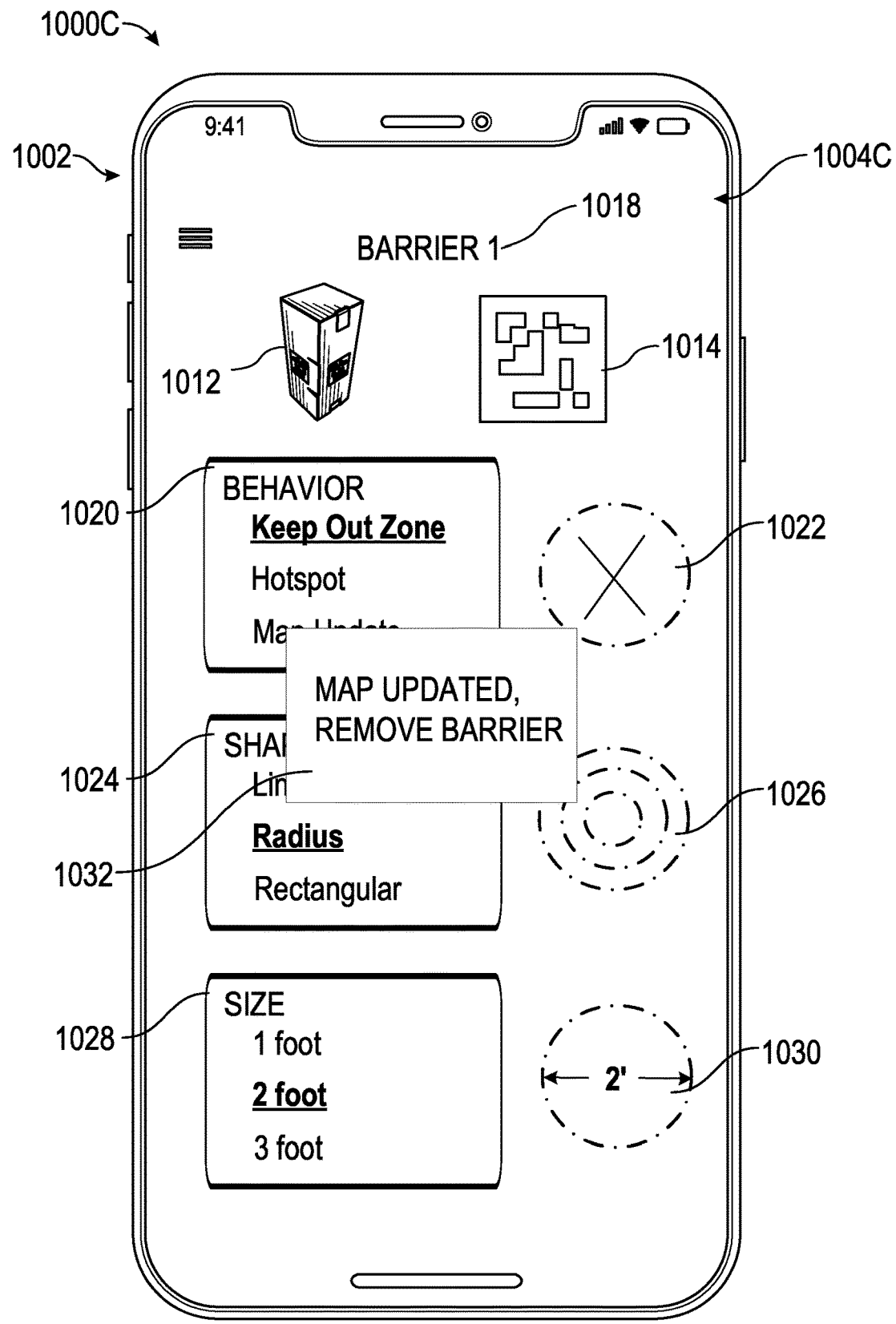
FIG. 10C illustrates a user interface of a handheld device that displays an image representing a mobile robot in a user's home.

FIGS. 10A-10C show examples of a user interface, such as screen framework of the user interface 520 of the system 500, for creating or performing a cleaning mission routine and controlling a mobile robot to execute the cleaning mission in an environment. The user interface can be a part of a handheld computing device, such as a smart phone, a cellular phone, a personal digital assistant, a laptop computer, a tablet, a smart watch, or other portable computing device capable of transmitting and receiving signals related to a robot cleaning mission. In an example, the handheld computing device is the mobile device 404.

The user interface can be configured to present, on a display (such as the display 524), information about one or more robots in a user's home and their respective operating status, one or more editable mission routines (e.g., a cleaning mission), a progress of a mission being executed. In some examples, a map of the environment or a portion thereof can be displayed along with objects in the environment. The user interface can also receive user instructions, such as via the user input 522, for creating or modifying a mission routine, managing a map, and controlling the robot navigation and mission execution.

FIG. 10A illustrates an example of a device 1000A configured to display a view of behaviors applicable to one or more visual indicator for placement within an environment. The view can also display relevant information to the user based on historical user-interactions with the robot, prior usage of the robot, or based on the context of a mission, such as the robot that is active in a mission, nature of the mission, and progress of a mission, etc.

The device 1000A can include a display 1002 configured to display a user interface 1004A. Through a single user interface 1004 (as shown in FIGS. 10A-10C), a user can coordinate behaviors of a robot. The user interface 1004A can include one or more user interface controls (e.g., buttons, selectable indications, checkboxes, dropdown lists, list boxes, sliders, links, tabstrips, text boxes, charts, windows, among others) that allow a user to select various functions of mission scheduling and robot control. The user interface 1004A can also include one or more shelves, which can be collections or groupings of indications, buttons, lists, text boxes, or the like.

The user interface 1004A can include (or can be configured to display) an image of a mobile cleaning robot image 1006 (robot image 1006). The robot image 1006 can represent a mobile cleaning robot (such as the robot 100) in an environment, such as the environment 40 discussed above, where the robot is communication with a processor of a control device, such as the mobile device 404. The image 1006 can notify a user that the prompts, indications, etc., will be used or communicated to the robot associated with the image 1006. The user interface 1004A can also be configured to display a text name indicator 1008, which can display a name of the robot, e.g., Alfred.

The user interface 1004A can also be configured to display a barrier indicator 1010, which can display a list of barrier options that are selectable by a user, such as "Barrier 1," "Barrier 2," "Barrier 3," and "Barrier 4." Other visual indicator names and quantities can be displayed by the user interface 1004A in the barrier indicator 1010. When a barrier is selected, such as Barrier 1, as shown in FIG. 10A, a barrier image 1012 and a visual indicator image 1014 can be displayed by the user interface. The barrier image 1012 and the visual indicator image 1014 can indicate to a user what the selected barrier looks like.

Additionally, or alternatively, a user can select a detection indication 1016. Selection of the detection indication 1016 can present the user with a camera screen to allow the user to use a camera (such as camera 1017) to scan the visual fiducial (e.g., matrix code) of the barrier that the user has manually selected. The processing circuitry can then determine, based on image data produced by the camera 1017, which barrier has been selected by the user. The user interface 1004A can then display the detected barrier, such as Barrier 1, as being selected (such as via bold text, underline text, highlighting, or the like), and can change the barrier image 1012 and the visual indicator image 1014 to match those of the detected barrier to help reduce time required to select or identify a barrier (or visual indicator or visual fiducial).

FIG. 10B shows a device 1000B configured to display a user interface 1004B on the device 1002. The device 1000B can be the same as the device 1000A; the user interface 1004B can be changed.

For example, following selection of a barrier, the user interface 1004B can be updated to display the barrier image 1012 and the visual indicator image 1014 along with a barrier name indicator 1018 to indicate to a user which barrier or visual indicator details will be selected and assigned using the user interface 1004B. For example, a behavior selection 1020 can present a list of behavior types selectable by the user where the selected behavior can be indicated in bold or underlined text (or highlighted text or the like). The selected behavior can also be displayed through a behavior indication 1022, which can be an image representing the type of behavior that the robot (such as the robot 800) will perform when the visual indication 1014 (or barrier) is detected by the robot 800. The behavior indication 1022 illustrates a keep out zone. The behavior indication 1022 can change as a user changes the selected behavior in the behavior selection 1020.

The user interface 1004B can also display a shape selection 1024 that can present a list of behavior shapes selectable by the user where the selected shape can be indicated in bold or underlined text (or highlighted text or the like). The selected shape can also be displayed through a shape indication 1026, which can be an image representing the shape of zone that the robot (such as the robot 800) will interact with when the visual indication 1014 (or barrier) is detected by the robot 800. The shape indication 1026 can be annular (or a circle), when Radius is selected, as shown in FIG. The shape indication 1026 can change as a user changes the selected shape in the shape selection 1024.

The user interface 1004B can also display a size selection 1028 that can present a list of behavior sizes selectable by the user where the selected size can be indicated in bold or underlined text (or highlighted text or the like). The selected size can also be displayed through a size indication 1026, which can be an image representing the size of zone that the robot (such as the robot 800) will interact with when the visual indication 1014 (or barrier) is detected by the robot 800. The size indication 1030 can display a representation of two feet, when "2 feet" is selected, as shown in FIG. 10B. The size indication 1030 can change as a user changes the selected size in the size selection 1028.

Alternatively, the user interface 1004B can be configured to display a behavior type, behavior shape, and behavior size based on detection of a barrier using the camera, as discussed with respect to FIG. 10A. For example, the user can cycle through barriers, scanning each individually, until one with desired behavior characteristics (e.g., behavior type, size, shape) is found.

Following completion of setup of the barrier, the user can confirm the barrier or visual indication selection and the processing circuitry can associate the selected criteria with the visual indication 1014 and the processing circuitry of the device 1002 can transmit the associated information to the robot 800.

FIG. 10C shows a device 1000C configured to display a user interface 1004C on the device 1002. The device 1000C can be the same as the devices 1000A and 1000B; the user interface 1004C can be changed.

Following setup, the user can navigate the user interface 1004 to perform a cleaning routine or mission. During or after completion of the mission or routine, the user interface 1004C can be changed to display a notification 1032, which can display a text message, such as "Map Updated, Remove Barrier." Such a notification can indicate to the user that the barrier or visual indicator that was placed by the user in the environment has been located and the map has been updated based on the visual indication and its associated behavior.

NOTES AND EXAMPLES

The following, non-limiting examples, detail certain aspects of the present subject matter to solve the challenges and provide the benefits discussed herein, among others.

Example 1 is a mobile cleaning robot system comprising: a mobile cleaning robot operable to clean a floor surface of an environment, the mobile cleaning robot including a camera; and processing circuitry in communication with the mobile cleaning robot and the camera, the processing circuitry configured to: produce an image output based on an optical field of view of the camera; detect a visual fiducial in the image output; determine a behavior modification based on the visual fiducial; and modify movement of the mobile cleaning robot based on the behavior modification.

In Example 2, the subject matter of Example 1 optionally includes wherein the behavior modification includes establishing a linear barrier that the mobile cleaning robot will not cross.

In Example 3, the subject matter of Example 2 optionally includes wherein a direction of the linear barrier is perpendicular to the visual fiducial.

In Example 4, the subject matter of any one or more of Examples 1-3 optionally include wherein the behavior modification includes establishing a keep-out zone for the mobile cleaning robot.

In Example 5, the subject matter of any one or more of Examples 1~4 optionally include wherein the behavior modification includes establishing a zone that requires additional cleaning frequency.

In Example 6, the subject matter of any one or more of Examples 1-5 optionally include the processing circuitry further configured to: modify a map of the environment based on the visual fiducial and the behavior modification.

In Example 7, the subject matter of any one or more of Examples 1-6 optionally include wherein the behavior modification indicates that an object to which the visual fiducial is secured is a moving object, where the moving object is likely to move around the environment.

In Example 8, the subject matter of Example 7 optionally includes wherein the behavior modification includes establishing a keep-out zone for moving object regardless of its position within the environment.

In Example 9, the subject matter of Example 8 optionally includes wherein the visual fiducial is a retroreflective matrix code.

In Example 10, the subject matter of any one or more of Examples 1-9 optionally include the processing circuitry further configured to: select a training behavior modification based on the visual fiducial; and modify a map or object of the environment based on the visual fiducial and the behavior modification.

In Example 11, the subject matter of any one or more of Examples 1-10 optionally include wherein the visual fiducial is a barcode.

Example 12 is a method of operating a mobile cleaning robot, the method comprising: operating the mobile cleaning robot to traverse a floor surface of an environment; producing an image output based on an optical field of view of a camera of the mobile cleaning robot; detecting a visual fiducial in the image output; determining a map modification based on the visual fiducial; and update, based on the map modification, an environment map that, at least in part, controls navigation of the mobile cleaning robot.

In Example 13, the subject matter of Example 12 optionally includes wherein updating the map includes adding a linear barrier that the mobile cleaning robot will not cross.

In Example 14, the subject matter of Example 13 optionally includes wherein a direction of the linear barrier is perpendicular to the visual fiducial.

In Example 15, the subject matter of any one or more of Examples 12-14 optionally include wherein updating the map includes establishing a keep-out zone for the mobile cleaning robot.

In Example 16, the subject matter of any one or more of Examples 12-15 optionally include wherein the visual fiducial is a matrix code located on a tower.

Example 17 is a mobile cleaning robot system comprising: a mobile cleaning robot operable to clean a floor surface of an environment, the mobile cleaning robot including a camera; a tower including a visual fiducial, the tower positionable in the environment; and processing circuitry in communication with the mobile cleaning robot and the camera, the processing circuitry configured to: produce an image output based on an optical field of view of the camera; detect the visual fiducial located in the image output; determine a behavior modification based on the visual fiducial; and modify movement of the mobile cleaning robot based on the behavior modification.

In Example 18, the subject matter of Example 17 optionally includes the processing circuitry further configured to: modify a map of the environment based on the visual fiducial and the behavior modification.

In Example 19, the subject matter of any one or more of Examples 17-18 optionally include wherein the behavior modification indicates that an object to which the visual fiducial is secured is a moving object, where the moving object is likely to move around the environment.

Example 20 is a mobile cleaning robot system comprising: a mobile cleaning robot operable to clean a floor surface of an environment, the mobile cleaning robot including a camera; a tower including a visual fiducial, the tower positionable in the environment; and processing circuitry in communication with the mobile cleaning robot and the camera, the processing circuitry configured to: produce an image output based on an optical field of view of the camera; detect the visual fiducial located in the image output; display, on a user interface, a menu for selecting a behavior modification; receiving a selected behavior modification from the user interface; and associating the visual fiducial with the selected behavior modification.

In Example 21, the subject matter of Example 20 optionally includes the processing circuitry further configured to: detect, during a mission, the visual fiducial located in the image output; determine the behavior modification based on the visual fiducial; and modify movement of the mobile cleaning robot based on the behavior modification.

Example 22 is a method of operating a mobile cleaning robot, the method comprising: providing a passive, three-dimensional indicator formed from the mobile cleaning robot packing materials; navigating the mobile cleaning robot about an environment; detecting the three-dimensional indicator; and adjusting a cleaning behavior of the mobile cleaning robot based on the detection of the three-dimensional indicator.

In Example 23, the subject matter of Example 22 optionally includes wherein the indicator indicates a behavioral control zone.

In Example 24, the subject matter of Example 23 optionally includes wherein the indicator indicates a size of the behavioral control zone.

In Example 25, the subject matter of Example 24 optionally includes wherein the size of the behavioral control zone is mechanically selectable by a user.

In Example 26, the subject matter of any one or more of Examples 23-25 optionally include wherein the indicator indicates a shape of the behavioral control zone.

In Example 27, the subject matter of any one or more of Examples 24-26 optionally include wherein a shape of the behavioral control zone is mechanically selectable by a user.

Example 28 is a method of operating a mobile cleaning robot, the method comprising: navigating the mobile cleaning about an environment prior to forming a map of the environment; detecting a passive visual indicator; and modifying a cleaning behavior of the mobile cleaning robot in an area of the environment based on detection of the passive indicator.

In Example 29, the subject matter of Example 28 optionally includes after forming the map of the environment, incorporating the area corresponding to the modified cleaning behavior into the map.

In Example 30, the subject matter of Example 29 optionally includes notifying a user that the passive indicator the map has been updated to incorporate the area corresponding to the modified cleaning behavior into the map.

In Example 31, the subject matter of any one or more of Examples 28-30 optionally include notifying a user that the passive indicator can be discarded.

In Example 32, the subject matter of any one or more of Examples 30-31 optionally include associating the passive indicator with a nearby object and adjusting cleaning behavior of the mobile cleaning robot when cleaning in a vicinity of the nearby object.

In Example 33, the apparatuses, systems, or methods of any one or any combination of Examples 1-32 can optionally be configured such that all elements or options recited are available to use or select from.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A mobile cleaning robot system comprising:
   a mobile cleaning robot operable to clean a floor surface of an environment, the mobile cleaning robot including an image capture device;
   a tower including a visual fiducial, the tower positionable in the environment; and
   processing circuitry in communication with the mobile cleaning robot and the image capture device, the processing circuitry configured to:
      produce an image output based on an optical field of view of the image capture device;
      detect the visual fiducial located in the image output;
      display, on a user interface, a menu for selecting a behavior modification;
      receive a selected behavior modification from the user interface; and
      associate the visual fiducial with the selected behavior modification.

2. The mobile cleaning robot system of claim 1, the processing circuitry further configured to:
   adjust a cleaning behavior of the mobile cleaning robot based on detection of the visual fiducial.

3. The mobile cleaning robot system of claim 1, the processing circuitry further configured to:
   detect, during a mission, the visual fiducial located in the image output;
   determine the behavior modification based on the visual fiducial; and
   modify movement of the mobile cleaning robot based on the behavior modification.

4. The mobile cleaning robot system of claim 1, wherein the visual fiducial indicates a behavior control zone.

5. The mobile cleaning robot system of claim 4, the processing circuitry further configured to:
   display, on a user interface, a menu for selecting a size of the behavior control zone;

receive a selected size of the behavior control zone from the user interface; and associate the visual fiducial with the selected size of the behavior control zone.

6. The mobile cleaning robot system of claim 4, the processing circuitry further configured to:

display, on a user interface, a menu for selecting a shape of the behavior control zone;

receive a selected shape of the behavior control zone from the user interface; and associate the visual fiducial with the selected shape of the behavior control zone.

7. The mobile cleaning robot system of claim 4, wherein the image capture device is a front-facing camera.

8. A mobile cleaning robot system comprising:

processing circuitry in communication with a mobile cleaning robot and an image capture device of the mobile cleaning robot, the processing circuitry configured to:

produce an image output based on an optical field of view of an environment of the image capture device;

detect, in the image output, a visual fiducial located on a user-placeable base in the environment;

display, on a user interface, a menu for selecting a behavior modification based on detection of the visual fiducial;

receive a selected behavior modification from the user interface; and associate the visual fiducial with the selected behavior modification.

9. The mobile cleaning robot system of claim 8, the processing circuitry further configured to:

detect, during a mission, the visual fiducial located in the image output;

determine the behavior modification based on the visual fiducial; and modify movement of the mobile cleaning robot based on the behavior modification.

10. The mobile cleaning robot system of claim 9, the processing circuitry further configured to:

display, on a user interface, a menu for selecting a type of behavior control;

receive a keep-out zone modification from the user interface; and update a map of the environment to include a keep-out zone.

11. The mobile cleaning robot system of claim 10, the processing circuitry further configured to:

display, on a user interface, a menu for selecting a shape of a behavior control zone;

receive a keep-out zone shape from the user interface; and update a map of the environment to include the keep-out zone shape.

12. The mobile cleaning robot system of claim 11, the processing circuitry further configured to:

display, on a user interface, a menu for selecting a size of the behavior control zone;

receive a keep-out zone size from the user interface; and update a map of the environment to include the keep-out zone size.

13. The mobile cleaning robot system of claim 12, the processing circuitry further configured to:

display, on the user interface, a keep-out zone image representing the keep-out zone size and keep-out zone shape based on the received keep-out zone size and the received keep-out zone shape, respectively.

14. The mobile cleaning robot system of claim 8, the processing circuitry further configured to:

display, on the user interface, an image representing the visual fiducial based on detection of the visual fiducial.

15. A mobile cleaning robot system comprising:

a mobile cleaning robot operable to clean a floor surface of an environment, the mobile cleaning robot including an image capture device;

processing circuitry in communication with the mobile cleaning robot and the image capture device, the processing circuitry configured to:

produce an image output based on an optical field of view of the image capture device;

detect a visual fiducial of a user-placed tower located in the image output;

display, on a user interface, a menu for selecting a behavior modification based on detection of the visual fiducial;

receive a selected behavior modification from the user interface; and associate the visual fiducial with the selected behavior modification.

16. The mobile cleaning robot system of claim 15, the processing circuitry further configured to:

display, on a user interface, a menu for selecting a type of behavior control;

receive a keep-out zone modification from the user interface; and update a map of the environment to include a keep-out zone.

17. The mobile cleaning robot system of claim 16, the processing circuitry further configured to:

display, on a user interface, a menu for selecting a shape of a behavior control zone;

receive a keep-out zone shape from the user interface; and update a map of the environment to include the keep-out zone shape.

18. The mobile cleaning robot system of claim 17, the processing circuitry further configured to:

display, on a user interface, a menu for selecting a size of the behavior control zone;

receive a keep-out zone size from the user interface; and update a map of the environment to include the keep-out zone size.

19. The mobile cleaning robot system of claim 18, the processing circuitry further configured to:

display, on the user interface, a keep-out zone image representing the keep-out zone size and keep-out zone shape based on the received keep-out zone size and the received keep-out zone shape, respectively.

20. The mobile cleaning robot system of claim 15, the processing circuitry further configured to:

display, on the user interface, an image representing the visual fiducial based on detection of the visual fiducial.

* * * * *